US012380608B2

(12) United States Patent
Singh et al.

(10) Patent No.: US 12,380,608 B2
(45) Date of Patent: Aug. 5, 2025

(54) ENHANCED DUAL VIDEO CALL WITH AUGMENTED REALITY STREAM

(71) Applicant: QUALCOMM Incorporated, San Diego, CA (US)

(72) Inventors: Vikram Singh, San Diego, CA (US); Shankar Ganesh Lakshmanaswamy, Bangalore (IN); Srinath Nagaraj, Bangalore (IN); Carlos Marcelo Dias Pazos, Carlsbad, CA (US); Abhishek Ranka, Bangalore (IN); Sandeep Kanakapura Lakshmikantha, Bangalore (IN); Vinay Melkote Krishnaprasad, Bangalore (IN); Sanjeev Mittal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/818,989

(22) Filed: Aug. 11, 2022

(65) Prior Publication Data

US 2024/0054688 A1 Feb. 15, 2024

(51) Int. Cl.
*G06T 11/00* (2006.01)
*G06T 9/00* (2006.01)
(Continued)

(52) U.S. Cl.
CPC ............ *G06T 11/00* (2013.01); *G06T 9/00* (2013.01); *H04L 65/65* (2022.05); *H04W 76/10* (2018.02); *G06T 19/006* (2013.01)

(58) Field of Classification Search
None
See application file for complete search history.

(56) References Cited

U.S. PATENT DOCUMENTS 11,825,239 B1 * 11/2023 Copping ................ H04N 7/157
2014/0359157 A1 * 12/2014 Bichot ............... H04N 21/2365
709/231
(Continued)

FOREIGN PATENT DOCUMENTS

CN 114710472 A * 7/2022 ......... H04L 65/1063
EP 2214376 A1 * 8/2010 ............ H04L 63/10
(Continued)

OTHER PUBLICATIONS

3GPP TR 23.700-60: "3rd Generation Partnership Project, Technical Specification Group Services and System Aspects, Study on XR (Extended Reality) and media services (Release 18)", 23700-60-020, 3rd Generation Partnership Project, Mobile Competence Centre, 650, Route Des Lucioles, F-06921 Sophia-Antipolis Cedex, France, V0.2.0, Apr. 22, 2022, 131 Pages, XP052137369, Paragraph [6.7.2].
(Continued)

*Primary Examiner* — Andrew G Yang
(74) *Attorney, Agent, or Firm* — QUALCOMM Incorporated

(57) ABSTRACT

Embodiments include methods performed by a processor of a receiving wireless device for rendering augmented reality content. The methods may include receiving real image data from a transmitting wireless device via a first data stream, and receiving augmented reality (AR) content from the transmitting wireless device via a second data stream that is an alt video stream, in which the AR content is for display with the real image data. Methods may further include displaying the AR content in conjunction with the real image data.
In some embodiments, the first data stream and the second data stream are Real-time Transport Protocol (RTP) streams.

30 Claims, 14 Drawing Sheets

(51) Int. Cl.
*H04L 65/65* (2022.01)
*H04W 76/10* (2018.01)
*G06T 19/00* (2011.01)

(56) References Cited

U.S. PATENT DOCUMENTS

| | | | |
|---|---|---|---|
| 2015/0049248 A1 | 2/2015 | Wang et al. | |
| 2018/0308257 A1* | 10/2018 | Boyce | H04N 19/42 |
| 2020/0073681 A1* | 3/2020 | Carroll | G06F 9/451 |
| 2021/0044779 A1 | 2/2021 | Prins et al. | |
| 2021/0360040 A1* | 11/2021 | Abdelmalek | H04L 65/1069 |
| 2022/0321926 A1* | 10/2022 | Yip | H04L 65/1016 |
| 2022/0368550 A1* | 11/2022 | Abhishek | H04L 12/1827 |
| 2023/0137219 A1* | 5/2023 | Kim | H04N 7/157 |
| | | | 348/43 |
| 2023/0231889 A1* | 7/2023 | Cho | H04L 65/1101 |
| | | | 370/352 |
| 2023/0254438 A1* | 8/2023 | Sherman | G06T 19/006 |
| | | | 348/239 |
| 2023/0419559 A1* | 12/2023 | Zhu | G06F 16/71 |
| 2024/0022619 A1* | 1/2024 | Liu | H04L 65/60 |

FOREIGN PATENT DOCUMENTS

| | | |
|---|---|---|
| WO | WO-2022021145 A1 * | 2/2022 |
| WO | 2022069790 A1 | 4/2022 |

OTHER PUBLICATIONS

Even R., et al., "Mapping RTP Streams to CLUE Media Captures", draft-ietf-clue-rtp-mapping-07.txt, Internet Engineering Task Force, IETF, Standardworkingdraft, Internet Society (ISOC) 4, Rue Des Falaises Ch—1205 Geneva, Switzerland, May 15, 2016, pp. 1-18, XP015113083, Paragraphs [1.Introduction], [4.Mapping].
International Search Report and Written Opinion—PCT/US2023/023153—ISA/EPO—Sep. 20, 2023. 13 pages.

\* cited by examiner

ENHANCED DUAL VIDEO CALL WITH AUGMENTED REALITY STREAM

BACKGROUND

Augmented reality (AR) is an interactive experience of a real-world environment where the objects that reside in the real world are enhanced by computer-generated perceptual information. There are multiple use cases in which this computer-generated perceptual information is received through a server. For example, the client, upon receiving the computer-generated perceptual information from the server, may use a compositor and augment the actual real-world image with the computer-generated perceptual image in real time. Thus, the computer-generated perceptual image may be overlaid with the real-world image to provide a user with additional information. Such applications have been implemented in mapping, tourism, education, maintenance and repair, medical, design, modeling, and retail applications, among others.

SUMMARY

Various aspects include methods performed by a processor of a receiving wireless device for rendering augmented reality content. Various aspect methods may include receiving real image data from a transmitting wireless device via a first data stream, receiving augmented reality (AR) content from the transmitting wireless device via a second data stream that is an alt video stream, in which the AR content is for display with the real image data, and displaying the AR content in conjunction with the real image data.

In some aspects, the first data stream and the second data stream may be Real-time Transport Protocol (RTP) streams, and the AR content may be received as part of an RTP extension header. In some aspects, the first data stream and the second data stream may be RTP Control Protocol (RTCP) streams, and the AR content may be received as part of an RTCP application-defined (APP) packet.

Some aspects may further include receiving a call setup request from the transmitting wireless device, configuring a modem of the receiving wireless device to receive data across the first data stream and the second data stream based on the call setup request, and establishing a Dual Video call including the first data stream and the second data stream with the transmitting wireless device according to RFC 4796.

In some aspects, receiving real image data from the transmitting wireless device via the first data stream may further include receiving encoded real image data from the transmitting wireless device via the first data stream, and receiving AR content from the transmitting wireless device via the second data stream may further include receiving encoded AR content from the transmitting wireless device via the second data stream. Some aspects may further include decoding the encoded real image data to obtain decoded real image data, and decoding the encoded AR content to obtain decoded AR content. In some aspects, displaying the AR content in conjunction with the real image data may further include displaying the decoded AR content in conjunction with the decoded real image data.

Some aspects may further include correlating the first data stream and the second data stream with RTP timestamps according to RFC 3550, in which displaying the AR content in conjunction with the real image data may further include displaying the AR content in conjunction with the real image data based on the RTP timestamps.

In some aspects, displaying the AR content in conjunction with the real image data may further include transmitting the real image data and coordinate translations to a monitor communicatively coupled to the receiving wireless device to cause the monitor to display the real image data and the coordinate translations, and transmitting the AR content and the coordinate translations to an AR user equipment communicatively coupled to the receiving wireless device to cause the AR user equipment to display the AR content and the coordinate translations.

Some aspects may further include compositing the AR content with the real image data to form a composite two-dimensional (2D) image, in which displaying the AR content in conjunction with the real image data may further include transmitting the composite 2D image to an AR user equipment communicatively coupled to the receiving wireless device to cause the AR user equipment to display the composite 2D image.

Some aspects may further include compositing the AR content with the real image data to form a composite 2D image, in which displaying the AR content in conjunction with the real image data may further include displaying the composite 2D image on a display terminal of the receiving wireless device.

In some aspects, receiving the AR content from the transmitting wireless device via the second data stream may further include receiving a composite 2D image composed of the AR content and the real image data from the transmitting wireless device via the second data stream, in which displaying the AR content in conjunction with the real image data may further include displaying the composite 2D image.

Further aspects include a computing device having a processor configured to perform one or more operations of any of the methods summarized above. Further aspects include a computing device having means for performing functions of any of the methods summarized above. Further aspects include a non-transitory processor-readable storage medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
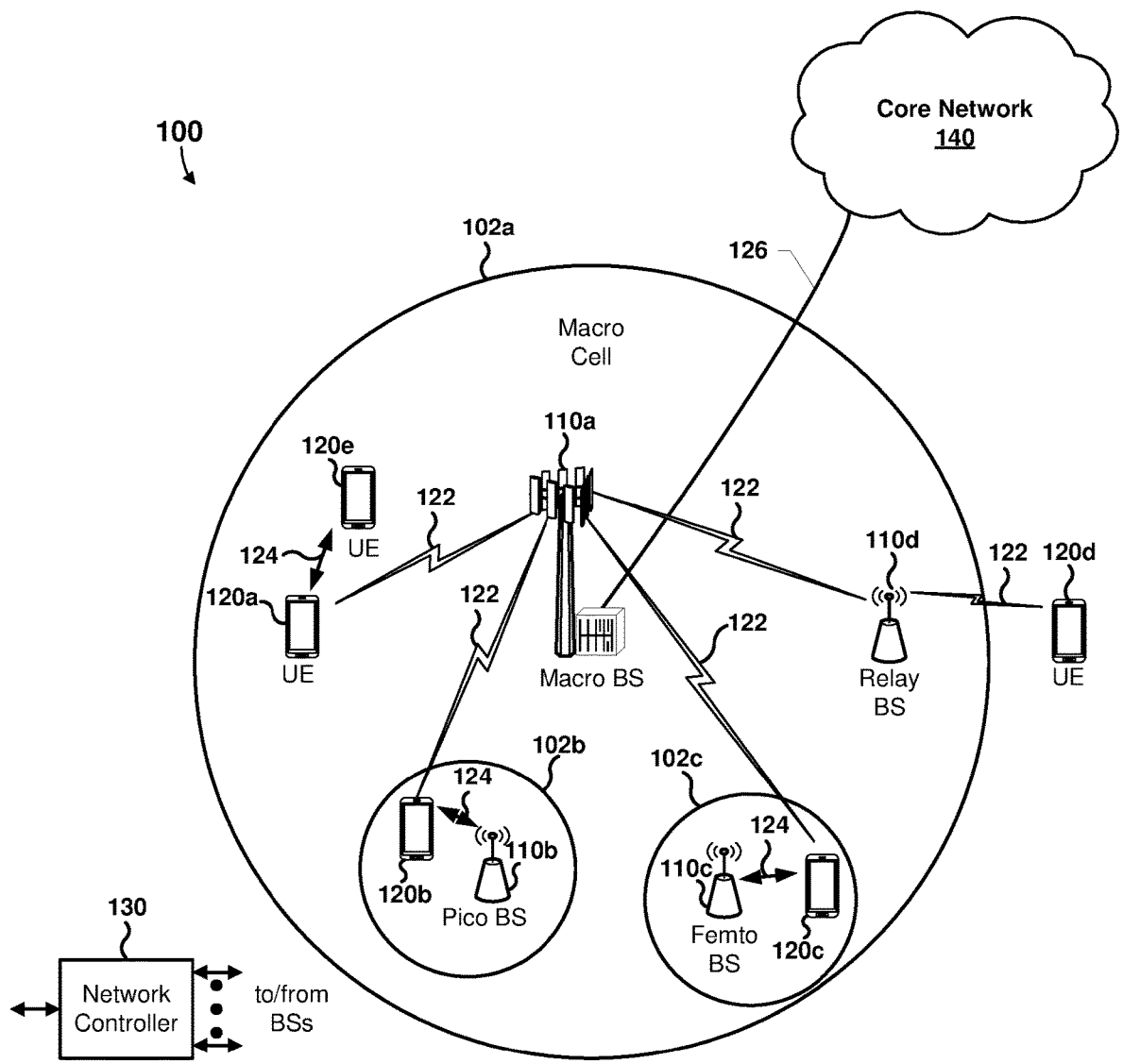
FIG. 1A is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and processors of a wireless device that receive augmented reality (AR) information across an ALT stream, or secondary stream, from a transmitting wireless device for purposes of rendering and displaying AR content in conjunction with real image data. Various embodiments may include a processor of a receiving wireless device (e.g., mobile phone) configured to receive real image data (i.e., data representing a real-world image captured by a camera/sensor) from a transmitting wireless device (e.g., mobile phone) via a first data stream. The processor of the receiving wireless device may be further configured to receive AR content from the transmitting wireless device via a second data stream, in which the second data stream is an ALT video stream.

The term "system-on-a-chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices.

The term "system-in-a-package" (SIP) may be used herein to refer to a single module or package that contains multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high speed communication circuitry and packaged in close proximity, such as on a single motherboard or in a single wireless device. The proximity of the SoCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA), IEEE 802.11 (WiFi), IEEE 802.16 (WiMAX), IEEE 802.20, Flash-OFDM®, etc. Reference may be made to wireless networks that use Long Term Evolution (LTE) standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in various embodiments.

As used herein, the terms "real image data" and "real-world image data" may interchangeably refer to data representing a captured two-dimensional (2D) image. The real-world image data may correspond to a real-world perspective view captured by a camera or other optical sensor. The real-world image data may be utilized by a processor to render and display a real-world image.

As used herein, the term "augmented reality (AR) content" may refer to content generated from real-world image data. AR content may include any number and type of images, characters, symbols, and visual representations that may be overlaid on a real-world image to provide a user with additional information.

As used herein, the terms "first data stream," "primary data stream," and "MAIN data stream" may interchangeably refer to a data stream established between two wireless devices that is capable of communicating media data. The MAIN data stream may be a "MAIN stream" as described with reference to Request for Comment (RFC) 4796.

As used herein, the terms "second data stream," "secondary data stream," and "ALT data stream" may interchangeably refer to a data stream between two wireless device that is capable of communicating media data. The ALT data stream may be an "ALT stream" as described with reference to RFC 4796. The ALT data stream is a data stream that is an alternative data stream to the MAIN data stream.

For conventional multimedia calls, a calling wireless device may establish a communications link with a called wireless device, in which multiple media streams are enabled for a single Call Session (e.g., Session Initiation Protocol ("SIP") Session). Generally, in such basic configurations, there is one active video stream and one corresponding active audio stream. For example, a user of a wireless device may initiate a video call, and a communication Session including a video stream displaying a front camera perspective or rear camera perspective and an accompanying audio stream may be established. In Dual Video applications, more than one video stream may be enabled. For example, a user may operate a wireless device to initiate a Call Session with another wireless device, in which the resulting connection enables the streaming of a front camera perspective in a first video stream and a rear camera perspective in a second video stream.

In Dual Video applications, one video stream is selected as a primary, or MAIN, stream, and the second video stream is selected as a secondary, or ALT, stream. RFC 4796 standardizes the procedural negotiations between the MAIN stream and the ALT stream in Dual Video applications. As in the aforementioned example implementing two video streams, one video stream (e.g., front camera perspective) may be selected as a MAIN stream, and the other video stream (e.g., rear camera perspective) may be selected as the ALT stream. The MAIN stream and ALT stream may be established as Real-time Transport Protocol (RTP) streams, and/or may be configured as RTP Control Protocol (RTCP) streams.

Various embodiments improve upon the Dual Video functionality as standardized in RFC 4796 by configuring the ALT stream as an AR stream, in which AR content or data is communicated from one wireless device to another for purposes of rendering the AR content in conjunction with a corresponding real-world image that is communicated via the MAIN stream. Since a MAIN stream may be configured conventionally as a video stream and an ALT stream may be configured as an AR stream, with both MAIN and ALT streams being configured as RTP streams being transmitted from a same source (i.e., a transmitting wireless device), the timing information (e.g., RTP timestamps) may be maintained at the receiving end (i.e., a receiving wireless device) to "stitch" the dual streams together to display the AR content in conjunction with real-world images with respect to real time. Thus, the configuring the ALT stream as an AR stream may enhance the video call experience by providing additional functionality beyond mere audio and video streaming. Similar streaming concepts may be applied with Dual Video streaming for other eXtended reality ("XR") environments including mixed reality ("MR") and virtual reality ("VR").

Various embodiments allow for configuring the ALT stream as an AR stream capable of communicating AR content in conjunction with real-world image data. Various embodiments may implement a processor of a receiving wireless device for rendering augmented reality content, in which the processor is configured to receive real image data from a transmitting wireless device via a first data stream (i.e., MAIN stream), receive AR content from the transmitting wireless device via a second data stream that is an ALT video stream (i.e., in which the AR content is for display with the real image data), and further configured to display the AR content in conjunction with the real image data.

In some embodiments, a first data stream and a second data stream may be RTP streams, and AR content may be received by a processor of a receiving wireless device as part of an RTP extension header. In some embodiments, a first data stream and a second data stream may be Real-time Transport Protocol (RTP) Control Protocol (RTCP) streams, and AR content may be received by the processor of the receiving wireless device as part of an RTCP custom payload (e.g., RTCP application-defined (APP) packet as described in RFC3550). In some embodiments, the processor of the receiving wireless device may correlate the first data stream and the second data stream with RTP timestamps according to RFC 3550, in which the AR content may be displayed in conjunction with real image data based on the RTP timestamps.

FIG. 1 is a system block diagram illustrating an example communication system 100 suitable for implementing any of the various embodiments. The communications system 100 may be a 5G New Radio (NR) network, or any other suitable network such as an LTE network, 5G network, etc. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless device 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short-range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, some embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a subcarrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-120e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some embodiments, two or more wireless devices 120a-120e (for example, illustrated as the wireless device 120a and the wireless device 120e) may communicate directly using one or more sidelink channels 124 (for example, without using a base station 110a-110d as an intermediary to communicate with one another). For example, wireless device 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a.

The wireless device 120a-120e may be configured to monitor channel conditions and report the channel conditions to the base station 110a-110d. For example, a channel condition may be indicated in channel state information (CSI) reported by the wireless device 120a-120e to the base station 110a-110d. CSI reported by the wireless device 120a-120e may include a channel quality indicator (CQI) index value indicated in a channel state feedback (CSF) report sent from the wireless device 120a-120e to the base station 110a-110d. CSI may be reported by the wireless device 120a-120e to the base station 110a-110d physical uplink control channel (PUCCH) or physical uplink shared channel (PUSCH). CQI index values may be observed or estimated channel measurements sent by the wireless device 120a-120e to the base station 110a-110d as an index value to indicate channel quality. CQI index values may be integer values, such as values 0-15, that indicate the quality of the DL channel as observed or estimated by the wireless device 120a-120e.

The base station 110a-110d may be configured to select wireless devices 120a-120e to receive broadcast packets based on channel quality estimates, such as based on channel conditions reported by the wireless devices 120a-120e in CSI reported by the wireless devices 120a-120e. CQI index values may be used by the base station 110a-110d to determine a modulation and coding scheme (MCS) value for a wireless device 120a-120e. A base station 110a-110d may construct an MCS pool containing the union of all MCS values determined from the CSI reports from the wireless devices 120a-120e in the cell. During rate control operations the base station 110a-110d may select a minimum MCS value to cover a percentage of the MCS pool, such as 25%, 50%, 100%, and select wireless devices 120a-120e having an MCS at or above the minimum MCS value to receive broadcast packets. Wireless devices 120a-120e having an MCS below the minimum MCS value may not be selected to receive broadcast packets.

Figure 1B:
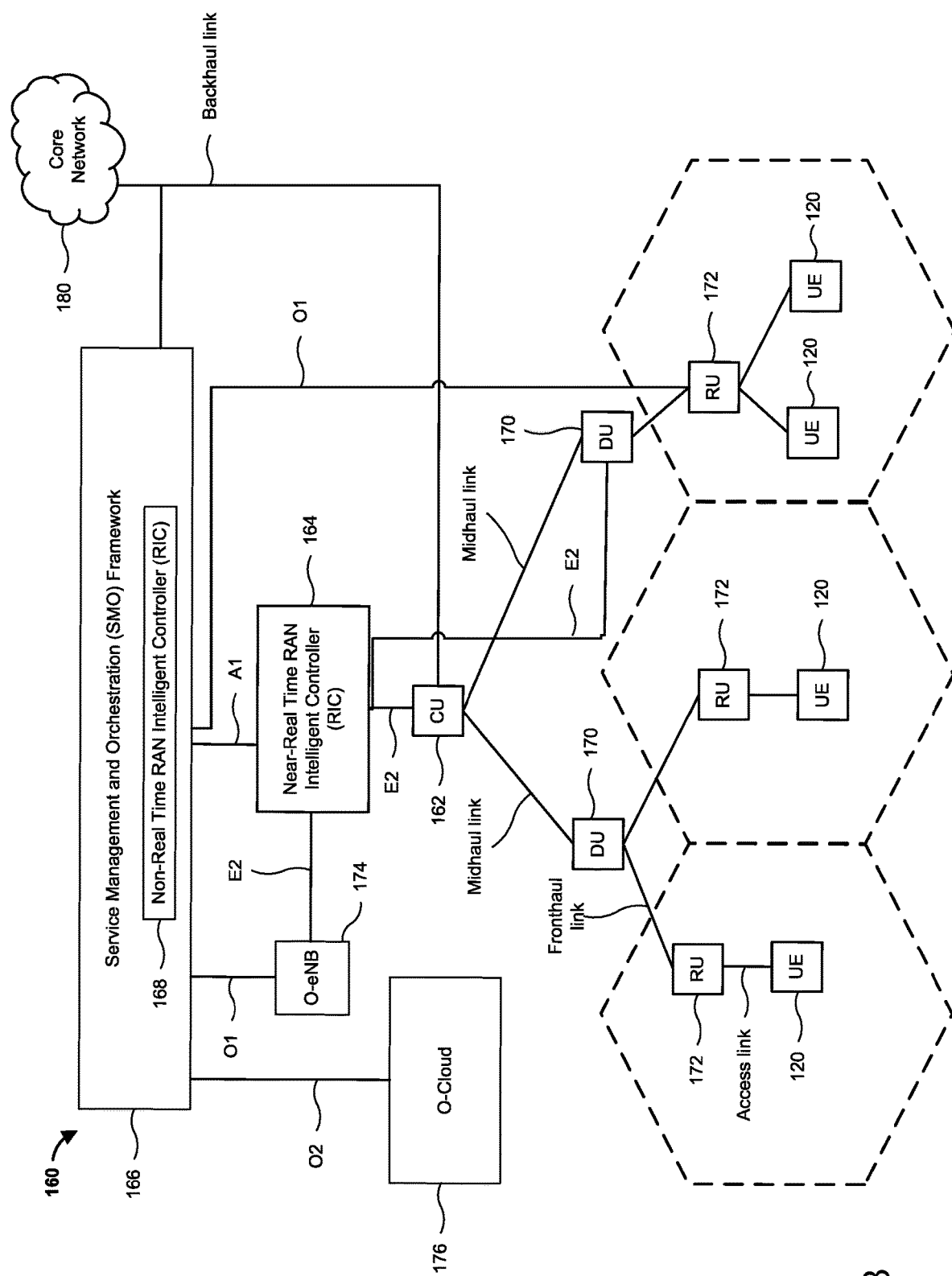
FIG. 1B is a system block diagram illustrating an example disaggregated base station architecture for wireless communication systems suitable for implementing any of the various embodiments.

FIG. 1B is a system block diagram illustrating an example disaggregated base station 160 architecture that may be part of a 5G network suitable for communicating AR content across an RTP stream. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, user equipment (UE), such as a vehicle safety system 104, may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random-access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based radio access network (RAN) architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 2:
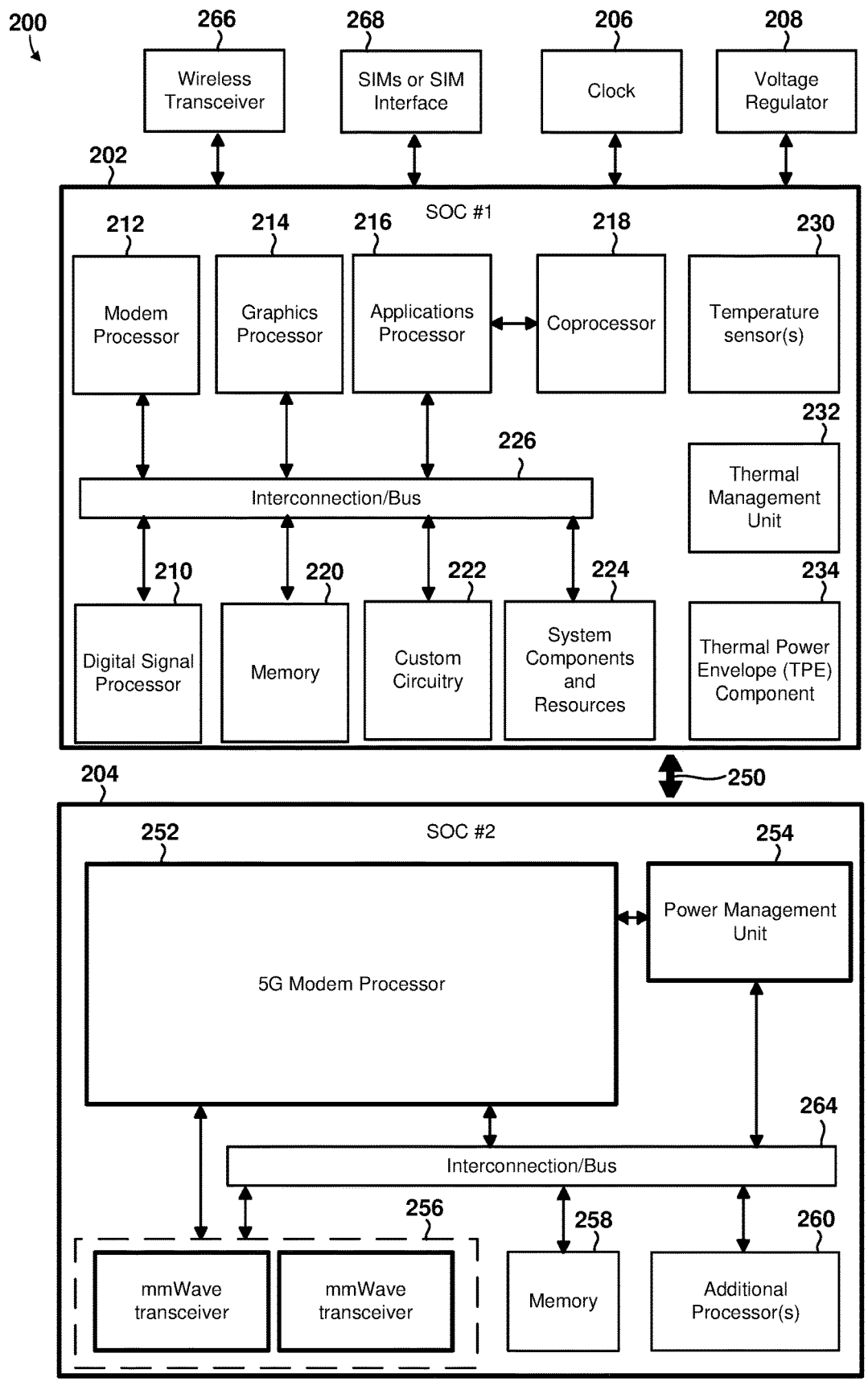
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SoC) or system in a package.

With reference to FIGS. 1A-2, the illustrated example wireless device 200 (which may be a system-in-a-package in some embodiments) includes a two SoCs 202, 204 coupled to a clock 206, a voltage regulator 208, at least one subscriber identity module (SIM) 268 and/or a SIM interface and a wireless transceiver 266 configured to send and receive wireless communications via an antenna (not shown) to/from network wireless devices, such as a base station 110a. In some embodiments, the first SoC 202 operate as central processing unit (CPU) of the wireless device that carries out the instructions of software application programs by performing the arithmetic, logical, control and input/output (I/O) operations specified by the instructions. In some embodiments, the second SoC 204 may operate as a specialized processing unit. For example, the second SoC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SoC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/ bus module 226, one or more temperature sensors 230, a thermal management unit 232, and a thermal power envelope (TPE) component 234. The second SoC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SoC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SoC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SoC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SoC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SoCs 202, 204 may further include an input/output module (not illustrated) for communicating with resources external to the SoC, such as a clock 206, a voltage regulator 208, one or more wireless transceivers 266, and at least one SIM 268 and/or SIM interface (i.e., an interface for receiving one or more SIM cards). Resources external to the SoC (e.g., clock 206, voltage regulator 208) may be shared by two or more of the internal SoC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example system-in-a-package 200 discussed above, various embodiments may be implemented in a wide variety of computing systems, which may include a single processor, multiple processors, multicore processors, or any combination thereof.

Figure 3:
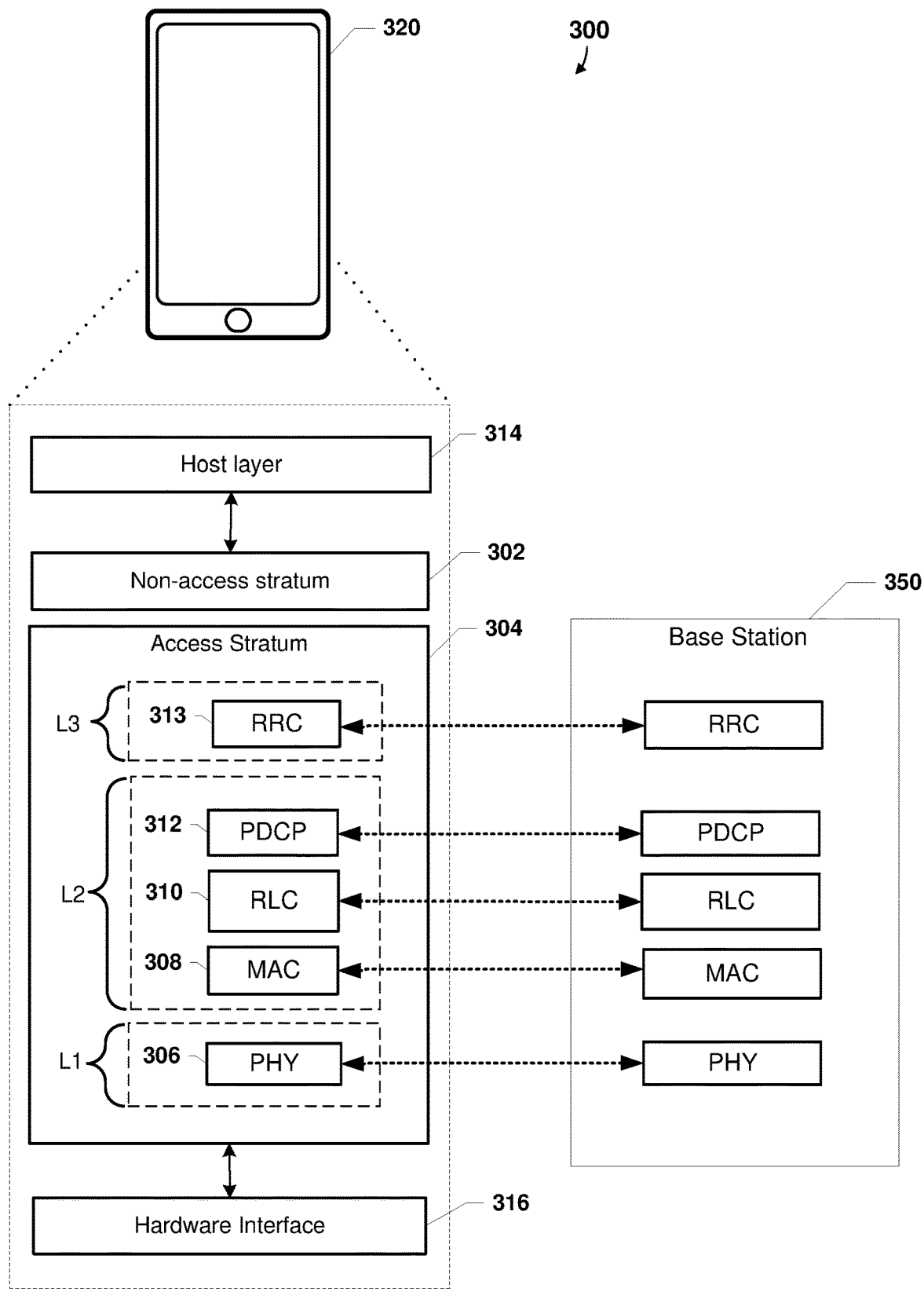
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a-d) of a communication system (e.g., 100). In some embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The PHY layer 306 may include various logical channels, including the Physical Downlink Control Channel (PDCCH) and the Physical Downlink Shared Channel (PDSCH). As an example, the PHY layer 306 may support CSI measurements and reporting (e.g., CQI measurements and reporting).

In the user and control planes, Layer 2 (L2) of the AS 304 may be responsible for the link between the wireless device 320 and the base station 350 over the physical layer 306. In the various embodiments, Layer 2 may include a Media Access Control (MAC) sublayer 308, a Radio link Control (RLC) sublayer 310, and a Packet data convergence protocol (PDCP) 312 sublayer, each of which form logical connections terminating at the base station 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general-purpose processor.

In other embodiments, the software architecture 300 may include one or more higher logical layer (e.g., transport, session, presentation, application, etc.) that provide host layer functions. In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
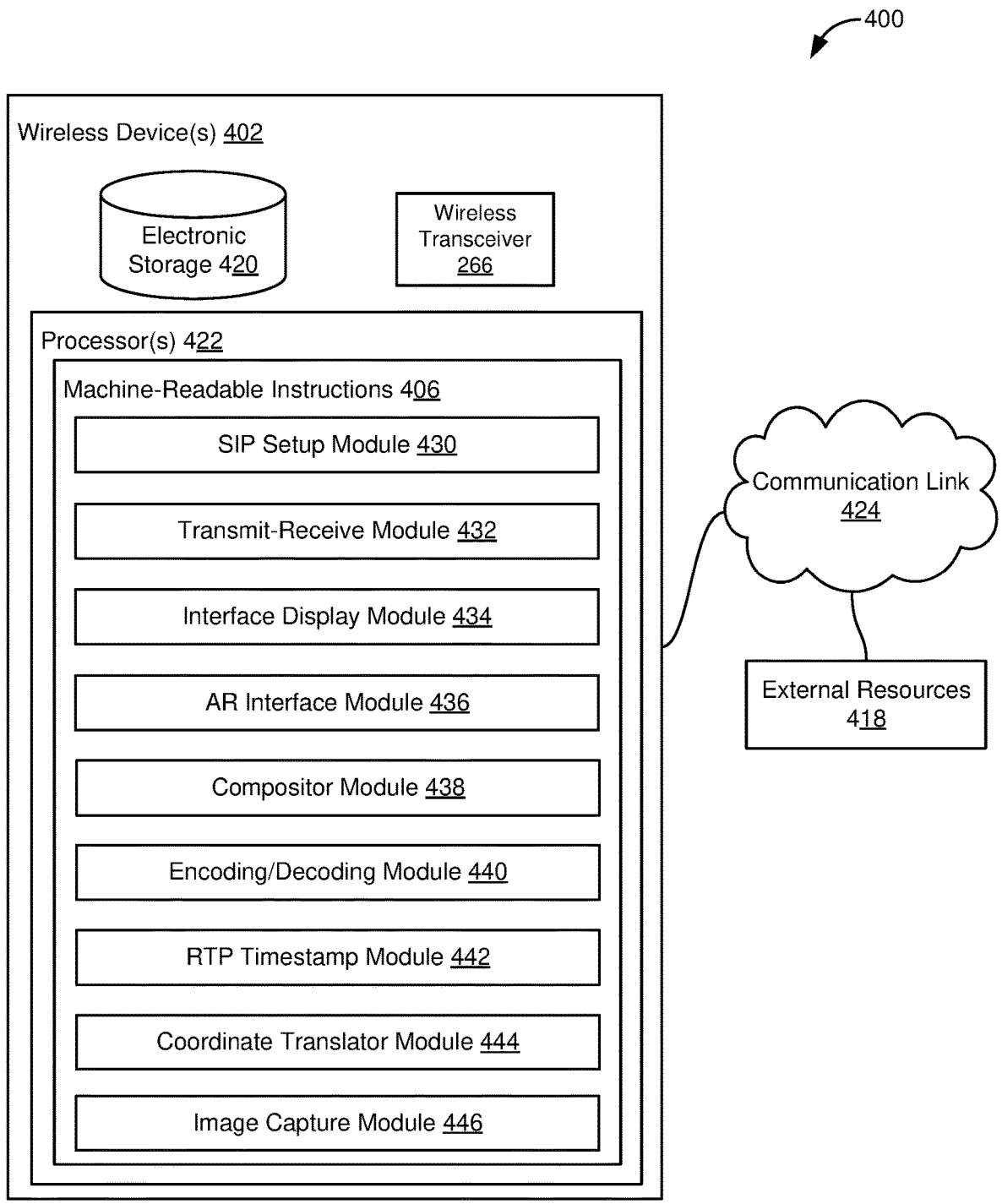
FIG. 4 is a component block diagram illustrating an example system configured to establish secure device-todevice communications between two wireless devices according to some embodiments.

FIG. 4 is a component block diagram illustrating an example system 400 configured to establish secure device-to-device communications between two wireless devices according to some embodiments. With reference to FIGS. 1-4, the system 400 may include one or more wireless device(s) 402 (e.g., the wireless device(s) 102, 104, 202, 320) and external resources 418 (e.g., AR glasses, AR servers), which may communicate via a wireless communication network 424. External resources 418 may include sources of information outside of the system 400, external entities participating with the system 400, or other resources. In some implementations, some or all of the functionality attributed herein to external resources 418 may be provided by resources included in the system 400. The system 400 may include a plurality of hardware, software, and/or firmware components operating together to provide the functionality attributed herein to the processor 422.

The wireless device(s) 402 may include electronic storage 420 that may be configured to store information related to functions implemented by the Session Initiation Protocol (SIP) setup module 430, transmit-receive module 432, the interface display module 434, the AR interface module 436, the compositor module 438, the encoding/decoding module 440, the RTP timestamp module 442, the coordinate translator module 444, the image capture module 446, and any other instruction modules.

The electronic storage 420 may include non-transitory storage media that electronically stores information. The electronic storage 420 may include one or both of system storage that is provided integrally (i.e., substantially non-removable) with the system 200 and/or removable storage that is removably connectable to the system 200 via, for example, a port (e.g., a universal serial bus (USB) port, a firewire port, etc.) or a drive (e.g., a disk drive, etc.). In various embodiments, electronic storage 420 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The electronic storage 420 may include one or more virtual storage resources (e.g., cloud storage, a virtual private network, and/or other virtual storage resources). The electronic storage 420 may store software algorithms, information determined by processor(s) 422, and/or other information that enables the system 200 to function as described herein.

The wireless device(s) 402 may be configured by machine-readable instructions 406. Machine-readable instructions 406 may include one or more instruction modules. The instruction modules may include computer program modules. The instruction modules may include one or more of a SIP setup module 430, transmit-receive module 432, the interface display module 434, the AR interface module 436, the compositor module 438, the encoding/decoding module 440, the RTP timestamp module 442, the coordinate translator module 444, the image capture module 446, and other instruction modules (not illustrated). The wireless device(s) 402 may include processor(s) 422 configured to implement the machine-readable instructions 406 and corresponding modules.

The processor(s) 422 may include one of more local processors that may be configured to provide information processing capabilities in the system 200. As such, the processor(s) 422 may include one or more of a digital processor, an analog processor, a digital circuit designed to process information, an analog circuit designed to process information, a state machine, and/or other mechanisms for electronically processing information. Although the processor(s) 422 is shown in FIG. 4 as a single entity, this is for illustrative purposes only. In some embodiments, the processor(s) 422 may include a plurality of processing units. These processing units may be physically located within the same device, or the processor(s) 422 may represent processing functionality of a plurality of devices distributed in the system 200.

In some embodiments, the processor(s) 422 executing the SIP setup module 430 may be configured to establish a Dual Video call including the first data stream and the second data stream with the transmitting wireless device according to RFC 4796. In some embodiments, the processor(s) 422 executing the SIP setup module 430 may be configured to configure a modem of the receiving wireless device to receive data across the first data stream and the second data stream based on the call setup request. In some embodiments, the processor(s) 422 executing the SIP setup module 430 may be configured to configure a modem of the transmitting wireless device to transmit data across the first data stream and the second data stream based on the call setup request.

In some embodiments, the processor(s) 422 executing the transmit-receive module 432 may be configured to receive real image data from a transmitting wireless device via a first data stream. In some embodiments, the processor(s) 422 executing the transmit-receive module 432 may be configured to receive AR content from the transmitting wireless device via a second data stream that is an ALT video stream, in which the AR content is for display with the real image data. In some embodiments, the processor(s) 422 executing the transmit-receive module 432 may be configured to transmit real image data to a receiving wireless device via a first data stream. In some embodiments, the processor(s) 422 executing the transmit-receive module 432 may be configured to transmit AR content to a receiving device via a second data stream that is an ALT video stream, in which the AR content is for display with the real image data. In some embodiments, the processor(s) 422 executing the transmit-receive module 432 may be configured to receive a call setup request from the transmitting wireless device. In some embodiments, the processor(s) 422 executing the transmit-receive module 432 may be configured to receive encoded real image data from the transmitting wireless device via the first data stream. In some embodiments, the processor(s) 422 executing the transmit-receive module 432 may be configured to receive encoded AR content from the transmitting wireless device via the second data stream. In some embodiments, the processor(s) 422 executing the transmit-receive module 432 may be configured to transmit the real image data and coordinate translations to a monitor communicatively coupled to the receiving wireless device to cause the monitor to display the real image data and the coordinate translations. In some embodiments, the processor(s) 422 executing the transmit-receive module 432 may be configured to transmit the AR content and the coordinate translations to an AR user equipment communicatively coupled to the receiving wireless device to cause the AR user equipment to display the AR content and the coordinate translations. In some embodiments, the processor(s) 422 executing the transmit-receive module 432 may be configured to transmit the composite 2D image to an AR user equipment communicatively coupled to the receiving wireless device to cause the AR user equipment to display the composite 2D image. In some embodiments, the processor(s) 422 executing the transmit-receive module 432 may be configured to receive a composite 2D image composed of the AR content and the real image data from the transmitting wireless device via the second data stream.

In some embodiments, the processor(s) 422 executing the interface display module 434 may be configured to display the AR content in conjunction with the real image data. In some embodiments, the processor(s) 422 executing the interface display module 434 may be configured to display the decoded AR content in conjunction with the decoded real image data. In some embodiments, the processor(s) 422 executing the interface display module 434 may be configured to display the composite 2D image on a display terminal of the receiving wireless device. In some embodiments, the processor(s) 422 executing the interface display module 434 may be configured to display the composite 2D image In some embodiments, the processor(s) 422 executing the AR interface module 436 may be configured to communicate with the transmit-receive module to cause the AR interface module 436 to perform display processes in a similar manner as the interface display module 434.

In some embodiments, the processor(s) 422 executing the compositor module 438 may be configured to compose the AR content with the real image data to form a composite 2D image.

In some embodiments, the processor(s) 422 executing the encoding/decoding module 440 may be configured to decode the encoded real image data to obtain decoded real image data. In some embodiments, the processor(s) 422 executing the encoding/decoding module 440 may be configured to decode the encoded AR content to obtain decoded AR content. In some embodiments, the processor(s) 422 executing the encoding/decoding module 440 may be configured to encode the real image data to obtain encoded real image data. In some embodiments, the processor(s) 422 executing the encoding/decoding module 440 may be configured to encode the AR content to obtain encoded AR content.

In some embodiments, the processor(s) 422 executing the RTP timestamp module 442 may be configured to correlate the first data stream and the second data stream with Real-time Transport Protocol (RTP) timestamps according to RFC 3550.

In some embodiments, the processor(s) 422 executing the coordinate translator module 444 may be configured to generate coordinate translations for use in displaying axial and/or spatial orientations of a device with respect to a perspective view of a real-world image.

In some embodiments, the processor(s) 422 executing the image capture module 446 may be configured to capture a real-world image of a perspective view of a user or a camera.

The description of the functionality provided by the different modules 430-446 is for illustrative purposes, and is not intended to be limiting, as any of modules 430-446 may provide more or less functionality than is described. For example, one or more of modules 430-446 may be eliminated, and some or all of its functionality may be provided by other ones of modules 430-446. As another example, processor(s) 422 may execute one or more additional modules that may perform some or all of the functionality attributed below to one of modules 430-446.

The processor(s) 422 may execute the modules 430-446 and/or other modules by software, hardware, firmware, some combination of software, hardware, and/or firmware, and/or other mechanisms for configuring processing capabilities on processor(s) 422.

Figure 5:
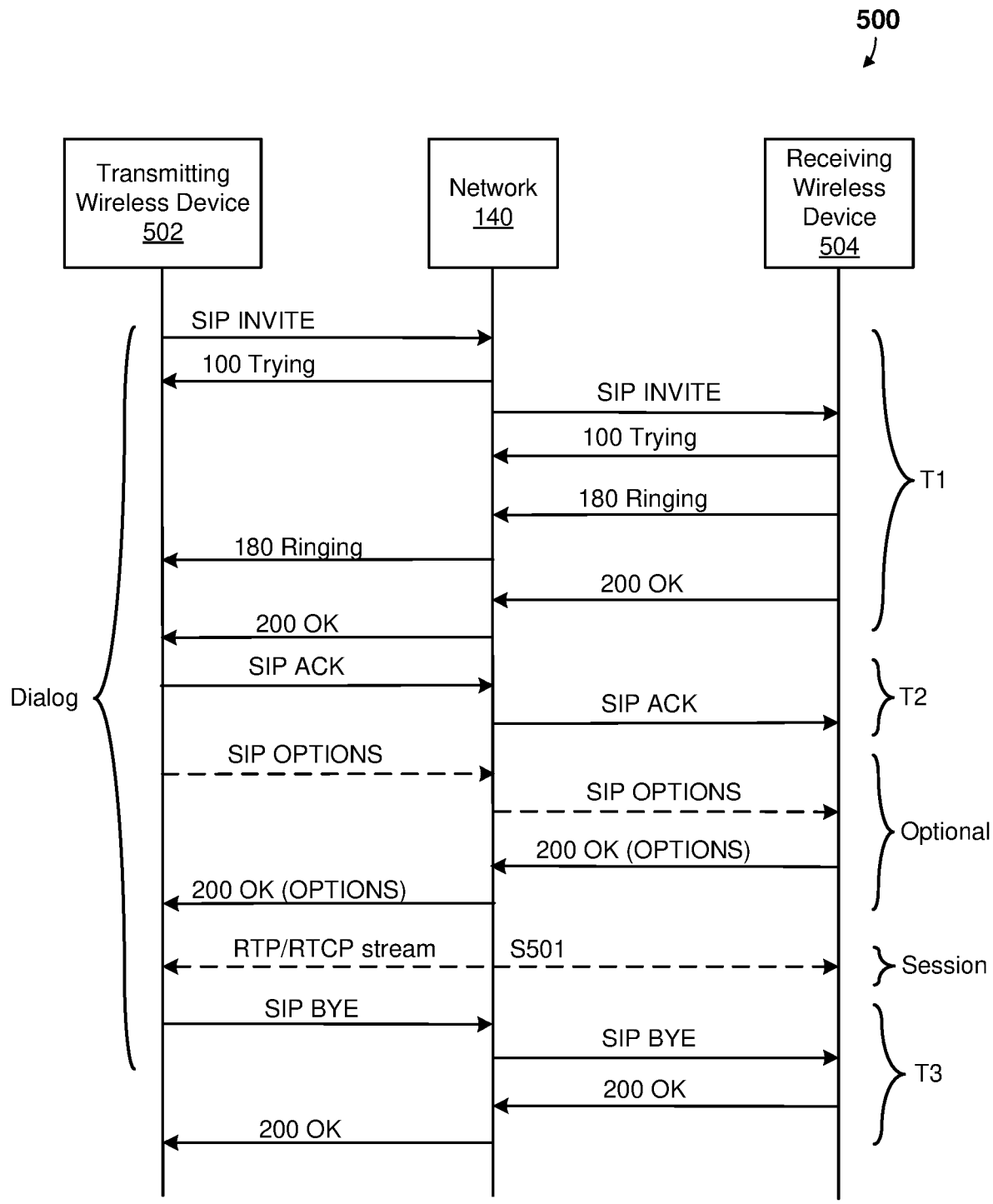
FIG. 5 is a message flow diagram illustrating message exchanges between a transmitting wireless device, a network, and a receiving wireless device during a call setup and active call according to various embodiments.

FIG. 5 is a message flow diagram 500 illustrating message exchanges between a transmitting wireless device 502, a network 140 (e.g., SIP proxy), and a receiving wireless device 504 during a call setup and active call according to various embodiments. With reference to FIGS. 1A-5, the transmitting wireless device 502 may establish an RTP/RTCP-based Dual Video call including a MAIN data stream and an ALT data stream with the receiving wireless device 504.

In some embodiments, a telecommunications network protocol (e.g., SIP) may be modified to include additional protocol messages to determine the capabilities of the receiving wireless device 504 and establish a call between the transmitting wireless device 502 and the receiving wireless device 504 based on the determined capabilities. In some embodiments, standardized messages (e.g., INVITE, ACK, etc.) of a telecommunications network protocol (e.g., SIP) may be modified to include additional features for determining the capabilities of the receiving wireless device 504 and establishing a call between the transmitting wireless device 502 and the receiving wireless device 504 based on the determined capabilities.

In the illustrated example, the telecommunications network implements SIP. However, the additional protocol messages may be implemented in a similar manner in other various telecommunication network protocols before establishing a connection between a calling wireless device and a called wireless device. In a telecommunications network implementing SIP, the additional protocol messages may be introduced into the sequence S501 before the transmitting wireless device 502 and the receiving wireless device 504 enter into a data exchange phase (e.g., Dual Video IP Multimedia Subsystem (IMS) call; RTP/RTCP streams). As illustrated in FIG. 5, various wireless devices may communicate with each other across a telecommunications network 140.

The transmitting wireless device 502 may determine whether the receiving wireless device 504 is capable of receiving AR content across a secondary stream in an RTP/RTCP configuration. If the transmitting wireless device 502 determines (e.g., based on a response (e.g., 200 OK) from the receiving wireless device 504) that the receiving wireless device 504 is capable of receiving AR content across a secondary stream in an RTP/RTCP configuration, the transmitting wireless device 502 may configure a modem of the transmitting wireless device 502 in preparation for transmitting AR content across the secondary/ALT stream in addition to causing the receiving wireless device 504 to configure a modem of the receiving wireless device 504 in preparation for receiving AR content across the secondary/ALT stream.

The transmitting wireless device 502 may determine if the receiving wireless device 504 is capable of receiving AR content across a secondary stream in an RTP/RTCP configuration and may indicate to the receiving wireless device 504 a request to initialize a secondary stream for conveying AR information by including additional information within SIP messages, such as in message headers and/or SIP OPTIONS messages.

In some embodiments, a User Agent Client (UAC) (e.g., transmitting wireless device 502) may implement a SIP User agent header field and a User Agent Server (UAS) (e.g., receiving wireless device 504) may implement a SIP Server header field. The SIP user agent header field may include information about the transmitting wireless device 502 originating a request. The SIP user agent header field may be included as part of an INVITE, PRACK, UPDATE, and/or ACK message, and may include information indicating that the transmitting wireless device 502 is capable of and/or requesting communication of AR content across secondary stream. The SIP server header field may include information about the software implemented by the receiving wireless device 504 to handle the request from the transmitting wireless device. The SIP server header field may be included as part of a SESSION PROGRESS, PRACK OK, UPDATE OK, RING, and/or OK INVITE message, and may include information indicating that the receiving wireless device 504 is capable of and/or has been configured to communicate AR content across a secondary stream.

In some embodiments, a Contact header field (e.g., RFC 3840) may be used to indicate a feature and device capability of the transmitting wireless device 502 and the receiving wireless device 504. The transmitting wireless device 502 may implement a Contact header field within an INVITE, UPDATE, and/or INVITE OK message to indicate that the transmitting wireless device 502 is capable of and/or is requesting communication of AR content across secondary stream. The receiving wireless device 504 may implement a Contact header field within a SESSION PROGRESS, UPDATE OK, and/or RINGING message to indicate that the receiving wireless device 504 is capable of and/or has been configured to communicate AR content across a secondary stream.

In some embodiments, SIP OPTIONS messages and corresponding 200 OK (OPTIONS) messages may be generated and/or configured to allow the transmitting wireless device 502 and the receiving wireless device 504 to query each other's device capabilities (e.g., capable of streaming AR content across a secondary stream).

The receiving wireless device 504 may receive a call setup request from the transmitting wireless device 502. The request may be transmitted from the transmitting wireless device 502 to the receiving wireless device 504 according to any known standard (e.g., Session Initiation Protocol ("SIP")). Based on the call setup request, a modem of the transmitting wireless device 502 may be configured to transmit data across a first data stream (i.e., primary data stream, MAIN data stream) and a second data stream (i.e., secondary data stream, ALT data stream), and a modem of the receiving wireless device 504 may be configured may be configured to receive data across the first data stream and the second data stream. After configuring the modems of the transmitting wireless device 502 and the receiving wireless device 504, a Dual Video call including the MAIN data stream and the ALT data stream may be established between the transmitting wireless device 502 and the receiving wireless device 504. The Dual Video call may be established and maintained in accordance with standards implementing multiple data streams within a single Session, such as RFC 4796. After establishing a Dual Video call between the transmitting wireless device 502 and the receiving wireless device 504, various types of data may be communicated between the transmitting wireless device 502 and the receiving wireless device 504 in communication S501 (e.g., Session).

In some embodiments in which the first data stream and the second data stream are RTP streams (e.g., MAIN data stream and ALT data stream respectively), AR content may be communicated across the second data stream as part of or otherwise embedded within an RTP extension header. In some embodiments in which the first data stream and the second data stream are RTCP streams, AR content may be communicated across the second data stream as part of an RTCP custom payload (e.g., RTCP APP packet).

Figure 6:
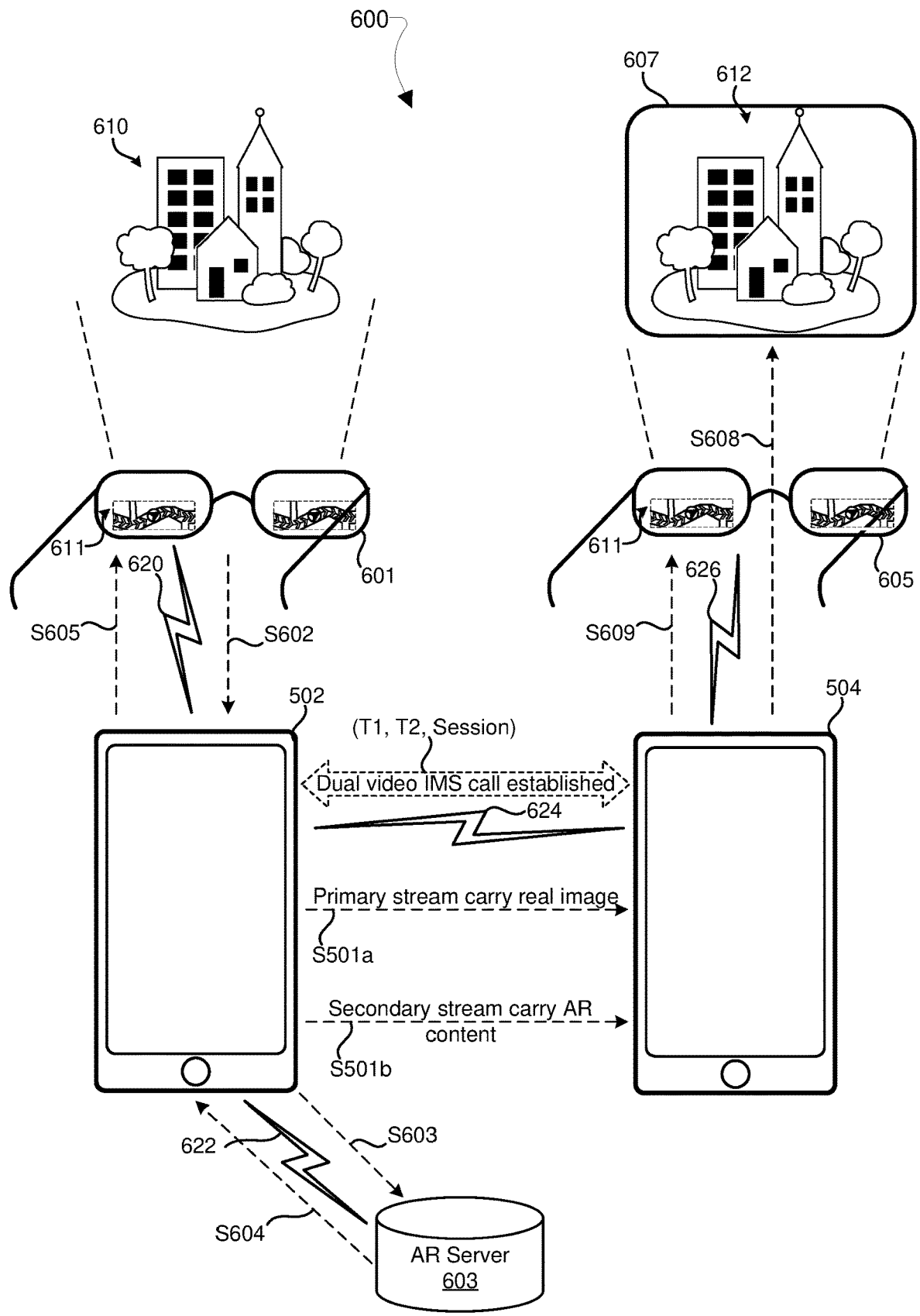
FIG. 6 is a system block diagram illustrating an example augmented reality (AR) communication system implementing an alternative (ALT) stream as an AR stream in accordance with some embodiments.

FIG. 6 is a system block diagram illustrating an example AR communication system 600 implementing an ALT stream as an AR stream in accordance with some embodiments. With reference to FIGS. 1A-6, the AR communication system 600 may include the transmitting wireless device 502, the receiving wireless device 504, an AR server 603, an AR UE 601, an AR UE 605, and a display terminal 607. The transmitting wireless device 502 may be communicatively coupled to the AR UE 601. The AR UE 601 and the AR UE 605 may be AR devices for rendering, displaying, or otherwise presenting AR content 611 to a user. For example, the AR UE 601 and the AR UE 605 may be AR glasses or an AR headset for rendering and displaying AR content 611 to a user.

The transmitting wireless device 502 may be in direct device-to-device communication with the receiving wireless device 504 via the wireless connection 624, with the AR UE 601 via the wireless connection 620, and with the AR server 603 via the wireless connection 622. The wireless connections 620, 622, and 624 may be any form of close-range wireless communications protocols, such as LTE-D, LTE sidelink (e.g., sidelink channel 124), WiFi, BT, BLE, or NFC, or may be any form of long-range communications (e.g., wireless communication link 122). In some embodiments, the transmitting wireless device 502 may be in communication with the AR server 603 across a telecommunications network (e.g., network 140). The receiving wireless device 504 may be in direct device-to-device communication with the AR UE 605 via the wireless connection 626. The wireless connection 626 may be any form of close-range wireless communications protocols, such as LTE-D, LTE sidelink (e.g., sidelink channel 124), WiFi, BT, BLE, or NFC, or may be any form of long-range communications (e.g., wireless communication link 122).

As illustrated, the transmitting wireless device 502 (e.g., mobile phone) may establish a Dual Video IP Multimedia Subsystem (IMS) call with the receiving wireless device 504 (e.g., mobile phone) according to the transactions T1, T2, and Session according to the SIP procedure (e.g., RFC 4796) as described with reference to FIG. 5. The Session between the transmitting wireless device 502 and the receiving wireless device 504 may be established after determining that the receiving wireless device 504 is capable of receiving data across multiple data streams (e.g., MAIN, ALT streams) in a Dual Video RFC 4796 configuration.

The AR UE 601 may be configured to capture real-world data, such as a snapshot or real-world image 612 based on a view of a real-world perspective view 610. A user operating the transmitting wireless device 502 and the AR UE 601 tethered or otherwise connected to the transmitting wireless device 502 may perceive an object, being, landscape, or any other type of view through the AR UE 601. The AR UE 601 may capture an image, video, or any sequence of images of the view perceived by the user operating the AR UE 601. In communication S602, the AR UE 601 may transmit one or more captured real-world images 612 to the transmitting wireless device 502.

In communication S603, the transmitting UE may transmit the real-world image 612 and/or metadata derived from the real-world image 612 to the AR server 603. In some embodiments, the transmitting wireless device 502 may analyze the real-world image 612 received from the AR UE 601 to obtain metadata that describes the real-world image 612. In such embodiments, the transmitting wireless device 502 may transmit the obtained metadata to the AR server 603. In some embodiments, the transmitting wireless device 502 may transmit the real-world image 612 received from the AR UE 601 directly to the AR server 603, and the AR server 603 may analyze the real-world image 612 to obtain metadata corresponding to the real-world image 612.

In communication S604, the AR server 603 may determine or otherwise generate AR content 611 based on the metadata derived from the real-world image 612, and may transmit the AR content 611 data to the transmitting wireless device 502. The AR content 611 may include graphical content to be imposed or otherwise augmented on the real-world image 612. In communication S605, the transmitting wireless device 502 may transmit the AR content 611 data to the AR UE 601, and the AR UE 601 may display the AR content 611 (e.g., on glasses panes, across headset screens) to the user.

In communication S501a, the transmitting wireless device 502 may transmit the real-world image 612 and/or any real-world image data associated with the real-world image 612 across the primary stream to the receiving wireless device 504. The transmitting wireless device 502 may encode the real-world image 612 data and may transmit the encoded real-world image 612 data to the receiving wireless device 504. In embodiments implementing RTP, the real-world image 612 data may be transmitted as part of an RTP extension header. In embodiments implementing RTCP, the real-world image 612 data may be transmitted as part of a custom payload (e.g., RTCP APP packet).

In communication S501b, the transmitting wireless device 502 may transmit the AR content 611 data across the secondary stream to the receiving wireless device 504. The transmitting wireless device 502 may encode the AR content 611 and may transmit the encoded AR content 611 data to the receiving wireless device 504. In embodiments implementing RTP, the AR content 611 data may be transmitted as part of an RTP extension header. In embodiments implementing RTCP, the AR content 611 data may be transmitted as part of a custom payload (e.g., RTCP APP packet). The secondary stream may be configured based on one or more query messages and responses implemented by the transmitting wireless device 502 and the receiving wireless device 504, such as SIP OPTIONS messages and/or other SIP messages including SIP User agent header fields, SIP Server header fields, and/or Contact header fields that define device capabilities. The secondary stream may be configured to include a payload type, port, codec, and other format parameters that allow the transmitting wireless device 502 and the receiving wireless device 504 to differentiate the secondary stream from the primary stream.

In some embodiments, the transmission of the real-world image 612 data across the primary stream and the AR content 611 data across the secondary data stream from the transmitting wireless device 502 to the receiving wireless device 504 may occur before, after, or during the transmission of the AR content 611 data from the transmitting wireless device 502 to the AR UE 601. For example, the transmitting wireless device 502 may receive the AR content 611 data from the AR server 603, and may prioritize transmitting the real-world image 612 data and AR content 611 data to the receiving wireless device 504 to minimize the time between generation of the AR content 611 data and the reception of the AR content 611 data by the receiving wireless device.

In some embodiments, the transmission of the AR content 611 data from the transmitting wireless device 502 across the secondary data stream to the receiving wireless device 504 may occur before, after, or during the transmission of the real-world image 612 data across the primary data stream. RTP timestamps may be generated and applied to the real-world image 612 data and the AR content 611 data, such that each set of a real-world image 612 data and corresponding AR content 611 data may share a same timestamp or may have timestamps that indicate that specific AR content 611 is correlated to a specific real-world image 612. Thus, if any data across the primary stream and the secondary stream is received out of order, or if AR content 611 data corresponding to a real-world image 612 is received by the receiving wireless device 504 before or after the corresponding real-world image 612 data is received, the receiving wireless device 504 may correctly match received AR content 611 data to corresponding received real-world image 612 data for purposes of rendering the AR content 611 in conjunction with the real-world image 612. Timestamps for the AR content 611 and the real-world image 612 may be assigned and correlated based on RFC 3550.

In embodiments in which the AR content 611 data and the real-world image 612 data have been encoded by the transmitting wireless device 502, the receiving wireless device 504 may decode the encoded AR content 611 data and the encoded real-world image 612 data to obtain decoded AR content 611 data and decoded real-world image 612 data that may be used to render an AR environment to a user of the receiving wireless device 504. The receiving wireless device 504 may decode the encoded AR content 611 data and the encoded real-world image 612 and may perform operations such as coordinate translation in preparation of rendering the decoded AR content 611 data and decoded real-world image 612 data on a display.

In communication S608, the receiving wireless device 504 may transmit the decoded real-world image 612 data (i.e., if previously encoded) to the display terminal 607. The display terminal 607 may be any terminal, interface, or screen capable of presenting a user with a view of the real-world image 612. The display terminal 607 may translate the real-world image 612 data to display the real-world image 612 to a user operating the receiving wireless device 504 and the AR UE 605.

In communication S609, the receiving wireless device 504 may transmit the decoded AR content 611 data (i.e., if previously encoded) to the AR UE 605. The AR UE 605 may translate the AR content 611 data to render AR content 611 to a user, in which the AR content 611 corresponds to the real-world image 612. Thus, a user operating the AR UE 605 may view the display terminal 607 through the AR UE 605, and AR content 611 corresponding to the real-world image 612 may be displayed on the AR UE 605 such that the AR content 611 is overlaid on the real-world image 612 according to the user's viewing perspective.

In some embodiments, the receiving wireless device 504 may include a translator that may provide coordinate translations to the display terminal 607 and the AR UE 605. The coordinate translations may provide recommendations to a user to adjust the position and angle of the AR UE 605 in a three-dimensional (3D) space such that the AR content 611 may be properly and accurately overlaying the corresponding real-world image 612 displayed on the display terminal 607. In some embodiments, the real-world image 612 data and the AR content 611 received by the receiving wireless device 504 may include coordinate translation information, and the AR UE 605 and the display terminal 607 may utilize the coordinate translation information to generate and display recommended axial and spatial orientations of the AR UE 605 with respect to the display terminal 607 to a user.

Figure 7:
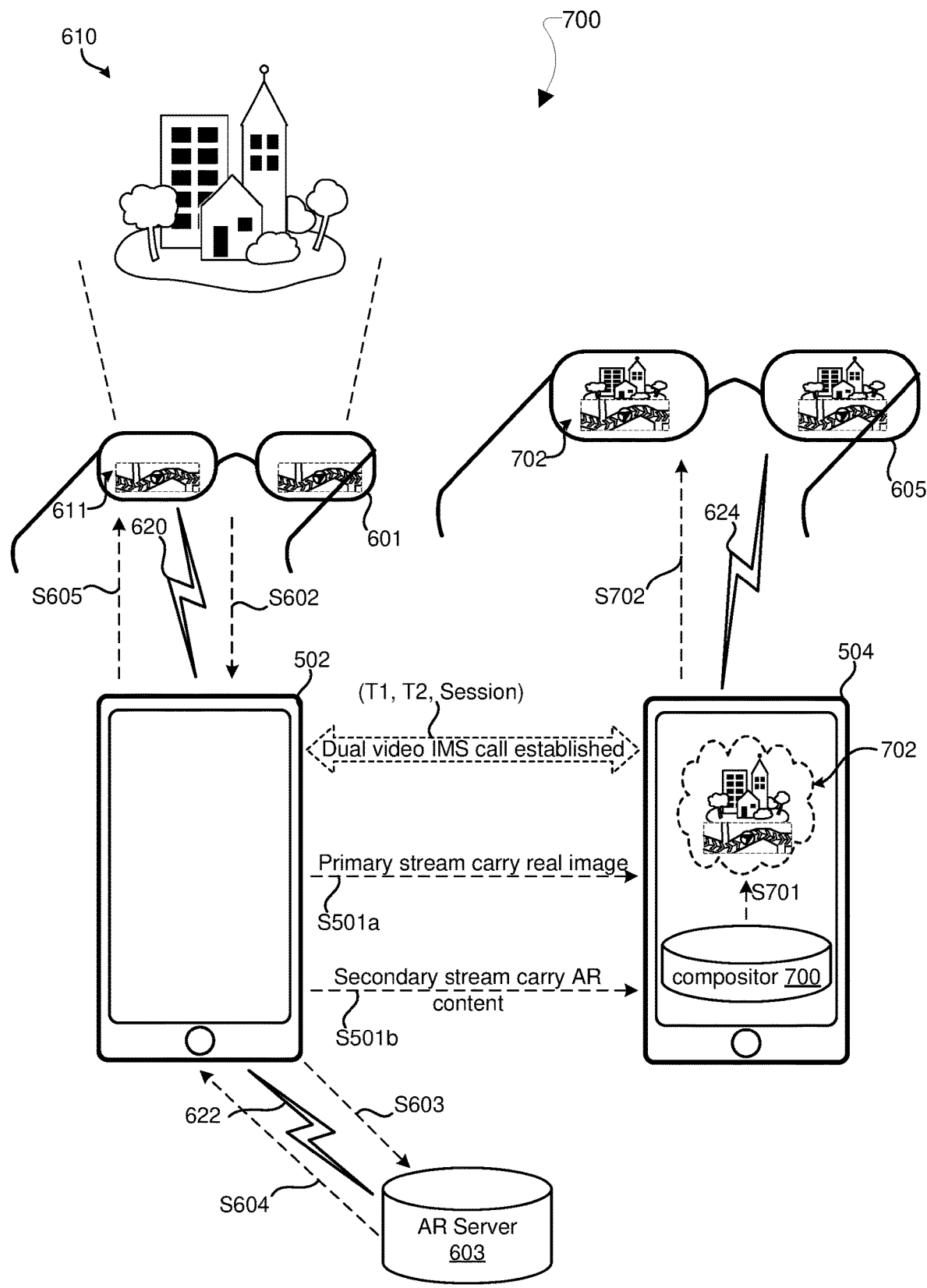
FIG. 7 is a system block diagram illustrating an example AR communication system implementing an ALT stream as an AR stream in accordance with some embodiments.

FIG. 7 is a system block diagram illustrating an example communication system implementing an ALT stream as an AR stream in accordance with some embodiments. Unless otherwise specified herein, the components illustrated in FIG. 7 may function in a same or similar manner as the same components described with reference to FIG. 6. For example, operations and processes performed by the transmitting wireless device 502, the receiving wireless device 504, the AR server 603, the AR UE 601, and the AR UE 605 may be performed in a similar manner as described with reference to FIG. 6 to convey AR content 611 data across an ALT stream for purposes of displaying the AR content 611 in conjunction with a real-world image 612.

In some embodiments, the receiving wireless device 504 may include a compositor 700, which may be a software functional block, a program, or mechanism implemented by a processor of the receiving wireless device 504. After receiving the AR content 611 data and the real-world image 612 data in communications S501a and S501b (and decoding the data if previously encoded by the transmitting wireless device 502), the compositor 700 of the receiving wireless device 504 may correlate the AR content 611 data with the real-world image 612 data (e.g., via RTP timestamps). After the compositor 700 correlates corresponding AR content 611 data with real-world image 612 data, the compositor 700 may generate a composite two-dimensional (2D) image 702 in communication S701. The composite 2D image 702 may include the AR content 611 overlaid with the real-world image 612. In communication S702, the receiving wireless device 504 may transmit the composite 2D image 702 to the AR UE 605 to cause the AR UE 605 to render and display to a user the composite 2D image 702.

In some embodiments, the compositor 700 may be a component or functional block of a database or server communicatively coupled to the receiving wireless device 504. For example, the receiving wireless device 504 may decode and transmit AR content 611 data and real-world image 612 data to an external server implementing the compositor 700, the external server may generate the composite 2D image 702 using the AR content 611 data and the real-world image 612 data, and the external server may transmit the composite 2D image 702 to the receiving wireless device 504 for display (i.e., on the receiving wireless device 504 and/or the AR UE 605).

Figure 8:
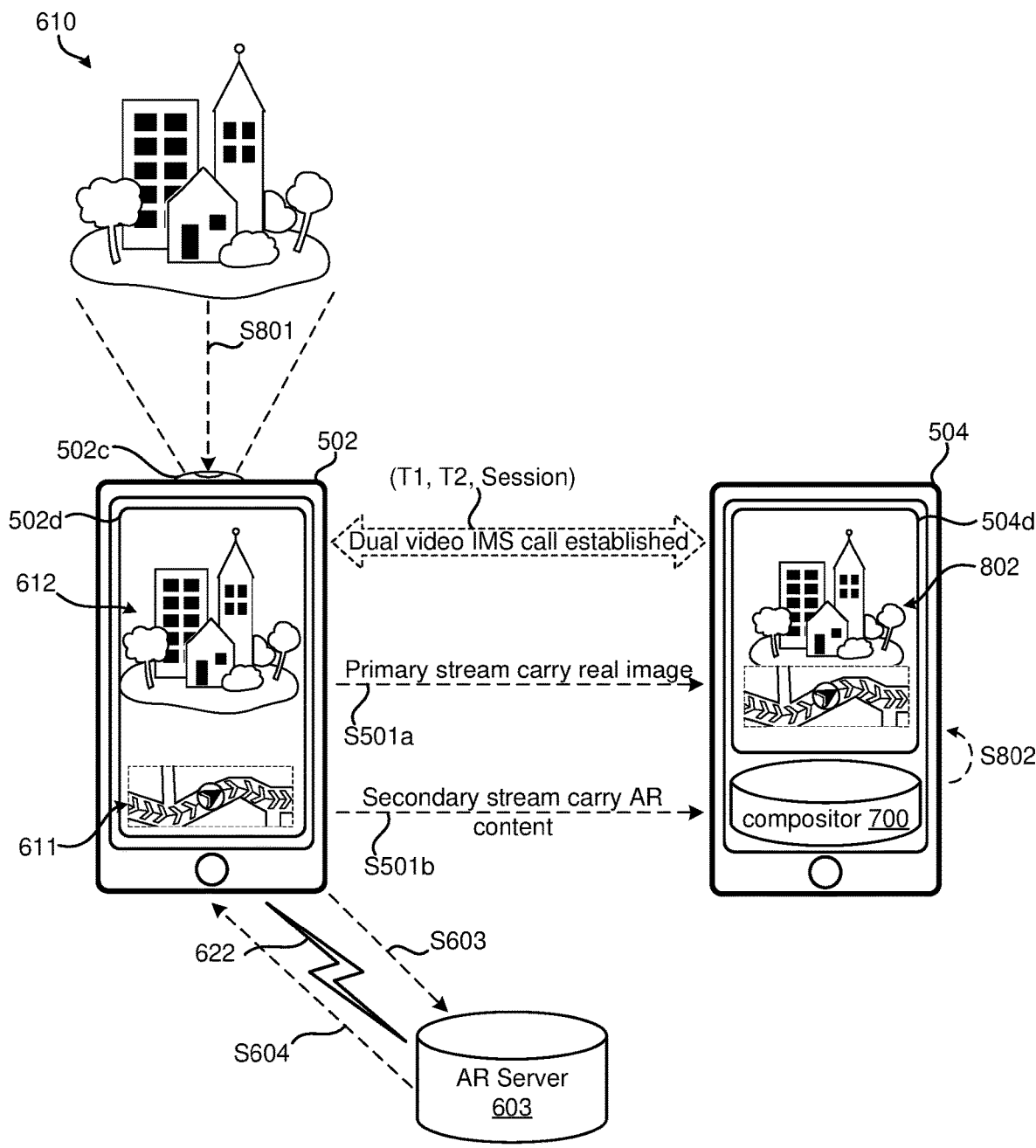
FIG. 8 is a system block diagram illustrating an example AR communication system implementing an ALT stream as an AR stream in accordance with some embodiments.

FIG. 8 is a system block diagram illustrating an example communication system implementing an ALT stream as an AR stream in accordance with some embodiments. Unless otherwise specified herein, the components as illustrated in FIG. 8 may function in a same or similar manner as the same components described with reference to FIGS. 6 and 7. For example, operations and processes performed by the transmitting wireless device 502, the receiving wireless device 504, and the AR server 603 may be performed in a similar manner as described with reference to FIGS. 6 and 7 to convey AR content 611 data across an ALT stream for purposes of displaying the AR content 611 in conjunction with a real-world image 612.

In some embodiments, the transmitting wireless device 502 may include an image capture mechanism 502c (e.g., mobile device camera) capable of generating a real-world image 612 based on a real-world perspective view 610. In communication S801, the image capture mechanism 502c may capture a real-world image 612. As previously described, the transmitting wireless device may transmit the real-world image 612 data to the AR server 603 in communication S603 and may receive corresponding AR content 611 data in communication S604. The transmitting wireless device 502 may optionally display the real-world image 612 besides the AR content 611 on a display 502d of the transmitting wireless device 502 before, after, or during the processing of the communications S501a and S501b. After performing communications S501a and S501b to convey the real-world image 612 data and the AR content 611 data to the receiving wireless device 504, the compositor 700 may correlate and combine the real-world image 612 and the AR content 611 to generate a composite 2D image 802 in communication S802. The receiving wireless device 504 may then display the composite image 802 on a display 504d of the receiving wireless device 504.

Figure 9:
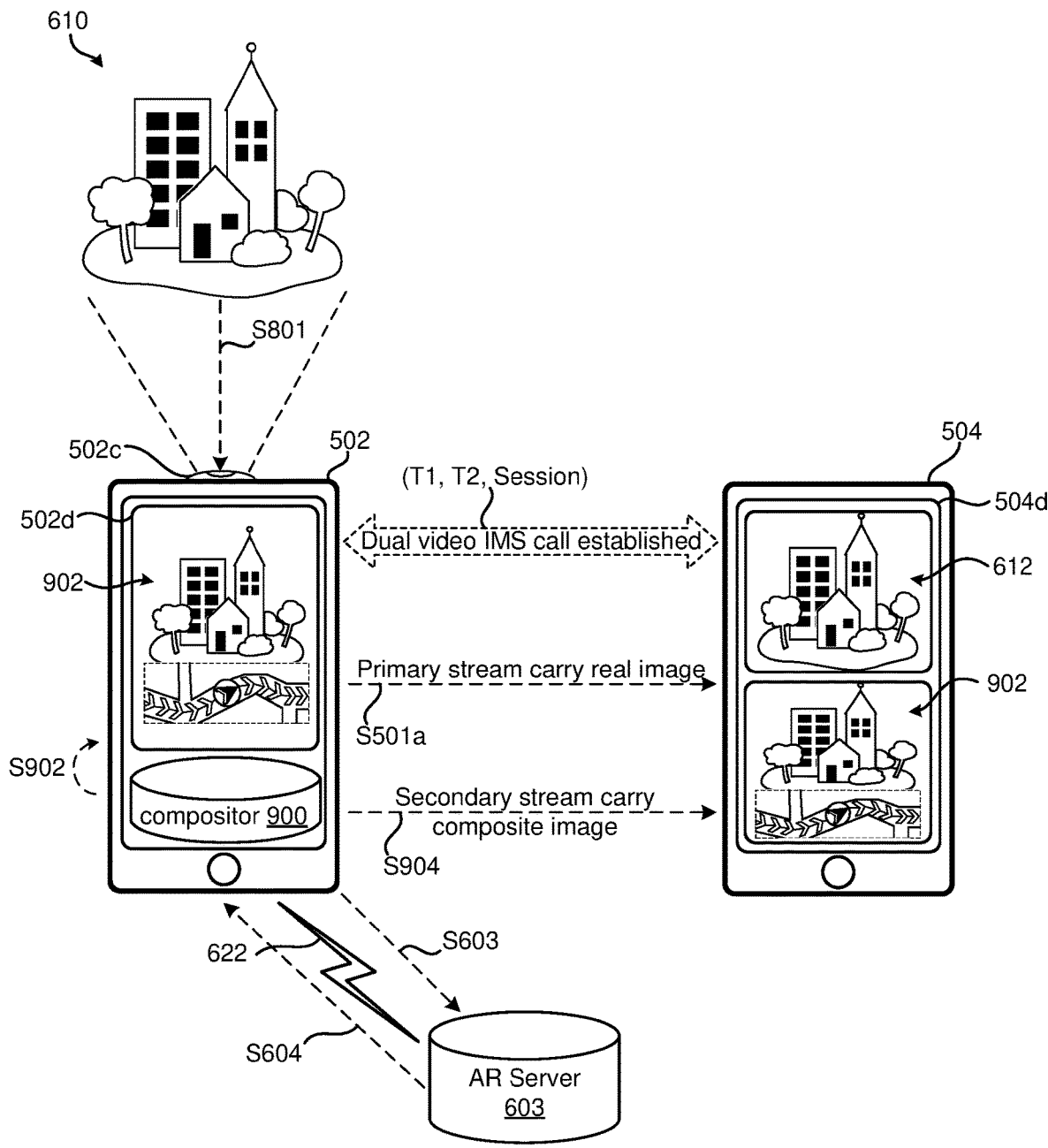
FIG. 9 is a system block diagram illustrating an example AR communication system implementing an ALT stream as an AR composite image stream in accordance with some embodiments.

FIG. 9 is a system block diagram illustrating an example communication system implementing an ALT stream as an AR composite image stream in accordance with some embodiments. Unless otherwise specified herein, the components as illustrated in FIG. 8 may function in a same or similar manner as the same components described with reference to FIGS. 6-8. For example, operations and processes performed by the transmitting wireless device 502, the receiving wireless device 504, and the AR server 603 may be performed in a similar manner as described with reference to FIGS. 6-8 to convey AR composite image data across an ALT stream for purposes of displaying the AR content 611 in conjunction with a real-world image 612.

In some embodiments, the transmitting wireless device 502 may include a compositor 900 that may perform operations in a similar manner as the compositor 700 as described with reference to FIGS. 7 and 8. For example, in communication S902, the compositor 900 may receive a real-world image 612 data and AR content 611 data based on the real-world image 612 data (i.e., from the AR server 603), and may generate a composite 2D image 902 in which the AR content 611 is overlaid upon the real-world image 612. In some embodiments, the transmitting wireless device 502 may display the composite 2D image 902 on the display 502d.

In communication S904, the transmitting wireless device 502 may transmit the 2D composite image 902 data across the ALT stream, or secondary stream, to the receiving wireless device 504. The ALT stream may be previously configured to transmit composite 2D images including the composite 2D image 902. The receiving wireless device 504 may render the composite 2D image 902 as received across the secondary stream by adjusting, if at all, a rendering size of the composite 2D image 902 to fit the rendering screen of the display 504d. The receiving wireless device 504 may then display the received composite 2D image 902 on the display 504d, and may optionally also display the real-world image 612. In some embodiments, a user of the receiving wireless device 504 may select which information (e.g., real-world image 612, composite 2D image 902) to display.

Additional embodiments including any number and combination of wireless devices (e.g., transmitting wireless device 502, receiving wireless device 504, AR UE 601, AR UE 605, AR server 603, display terminal 607, etc.) may be contemplated by one of ordinary skill in the art in view of the present disclosure. For example, a transmitting wireless device may include multiple modems and may communicate the same AR content across multiple ALT streams to multiple receiving wireless devices. As another example, any number of AR displays may be communicatively connected to a receiving wireless device such that multiple users may simultaneously experience a same AR experience. As a further example, various embodiment may be implemented with or without AR glasses, such that any transmitting or receiving wireless device involved in communicating AR content or composite 2D images across an ALT stream may additionally or alternatively display the AR content and/or composite 2D images (i.e., instead of on AR glasses).

Figure 10A:
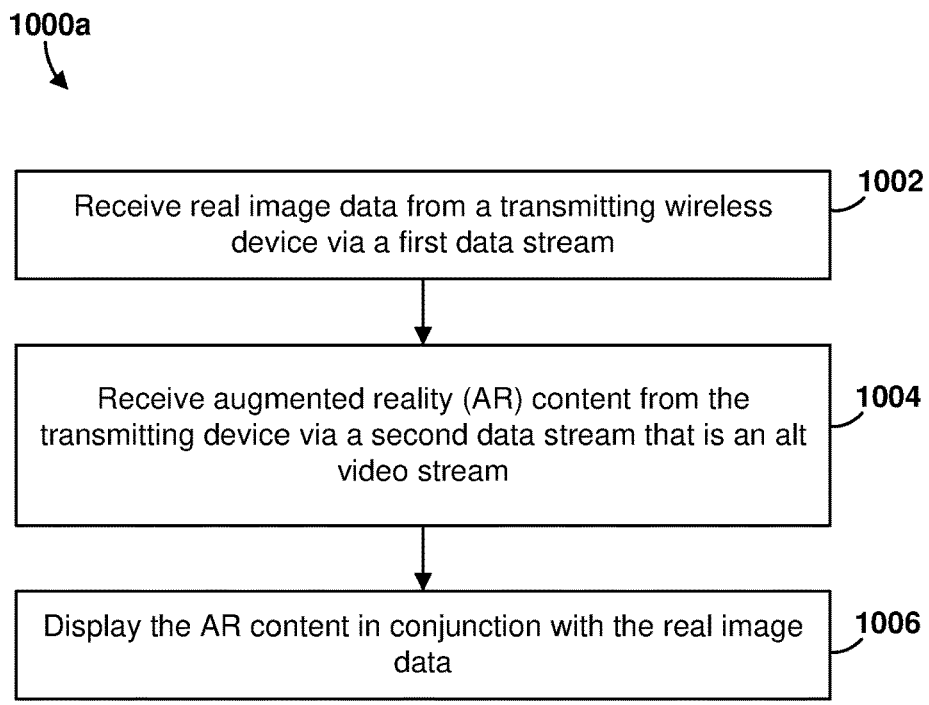
FIG. 10A is a process flow diagram of an example method 1000a for rendering AR content in accordance with various embodiments.

FIG. 10A is a process flow diagram of an example method 1000a that may be performed by a processor of a receiving wireless device for rendering AR content in accordance with various embodiments. FIGS. 10B-10E are process flow diagrams of example operations 1000b-1000e that may be performed as part of the method 1000a as described for rendering augmented reality content in accordance with some embodiments. With reference to FIGS. 1A-10E, the method 1000a and the operations 1000b-1000e may be performed by a processor (e.g., 210, 212, 214, 216, 218, 252, 260, 422) of a wireless device (e.g., 120, 200, 320, 402, 504). In some embodiments, the processor (e.g., 210, 212, 214, 216, 218, 252, 260, 422) may be configured to perform the operations by processor-executable instruction stored in a non-transitory processor-readable medium (e.g., 220, 258, 420). Means for performing each of the operations of the method 1000a and the operations 1000b-1000e may be a processor of the systems 100, 160, 200, 300, 400, 500, 600, 700, 800, and 900, such as the processors 210, 212, 214, 216, 218, 252, 260, 422, and/or the like as described with reference to FIGS. 1A-9.

In block 1002, the processor of the receiving wireless device may perform operations including receiving real image data from a transmitting wireless device via a first data stream. Real image data, or real-world image 612 data may be received by a receiving wireless device 504 from a transmitting wireless device 502 across a first data stream (e.g., MAIN data stream, primary data stream). In some embodiments, receiving real image data from the transmitting wireless device via the first data stream may include receiving encoded real image data from the transmitting wireless device via the first data stream. Means for performing the operations of block 1002 may include a processor (e.g., 210, 212, 214, 216, 218, 252, 260, 422) of a wireless device (e.g., 120, 200, 320, 402, 504) executing the transmit-receive module 432.

In block 1004, the processor of the receiving wireless device may perform operations including receiving AR content from the transmitting wireless device via a second data stream that is an alt video stream, in which the AR content is for display with the real image data. AR content data (e.g., AR content 611 data) may be received by a receiving wireless device (e.g., receiving wireless device 504) from a transmitting wireless device (e.g., transmitting wireless device 502) across a second data stream (e.g., ALT data stream, secondary data stream). In some embodiments, receiving AR content from the transmitting wireless device via the second data stream may include receiving encoded AR content from the transmitting wireless device via the second data stream. In some embodiments, receiving the AR content from the transmitting wireless device via the second data stream may include receiving a composite 2D image composed of the AR content and the real image data from the transmitting wireless device via the second data stream. Means for performing the operations of block 1004 may include a processor (e.g., 210, 212, 214, 216, 218, 252, 260, 422) of a wireless device (e.g., 120, 200, 320, 402, 504) executing the transmit-receive module 432.

In some embodiments, the first data stream and the second data stream may be Real-time Transport Protocol (RTP) streams, and the AR content may be received as part of an RTP extension header. In some embodiments, the first data stream and the second data stream may be Real-time Transport Protocol (RTP) Control Protocol (RTCP) streams, and the AR content may be received as part of an RTCP custom payload (e.g., RTCP APP packet).

In block 1006, the processor of the receiving wireless device may perform operations including displaying the AR content (e.g., AR content 611) in conjunction with the real image data (e.g., real-world image 612). After receiving the real image data and the AR content as described with reference to blocks 1002 and 1004, the processor may overlay AR content over the real image data or may create a composite 2D image from the AR content and the real image data to render an AR environment on a display visible to a user of the receiving wireless device (e.g., receiving wireless device 504). In some embodiments, displaying the AR content in conjunction with the real image data may include displaying the decoded AR content in conjunction with the decoded real image data. In some embodiments, displaying the AR content in conjunction with the real image data may include transmitting the real image data and coordinate translations to a monitor (e.g., display terminal 607) communicatively coupled to the receiving wireless device to cause the monitor to display the real image data and the coordinate translations and transmitting the AR content and the coordinate translations to an AR user equipment (e.g., AR UE 605) communicatively coupled to the receiving wireless device to cause the AR user equipment to display the AR content and the coordinate translations. In some embodiments, displaying the AR content in conjunction with the real image data may include displaying the composite 2D image (e.g., 702, 802, 902) on a display terminal of the receiving wireless device. In some embodiments, displaying the AR content in conjunction with the real image data may include displaying the AR content in conjunction with the real image data based on the RTP timestamps. In some embodiments, displaying the AR content in conjunction with the real image data may include transmitting the composite 2D image to an AR user equipment communicatively coupled to the receiving wireless device to cause the AR user equipment to display the composite 2D image. Means for performing the operations of block 1006 may include a processor (e.g., 210, 212, 214, 216, 218, 252, 260, 422) of a wireless device (e.g., 120, 200, 320, 402, 504) executing the transmit-receive module 432, the interface display module 434, the AR interface module 436, and the coordinate translator module 444.

Figure 10B:
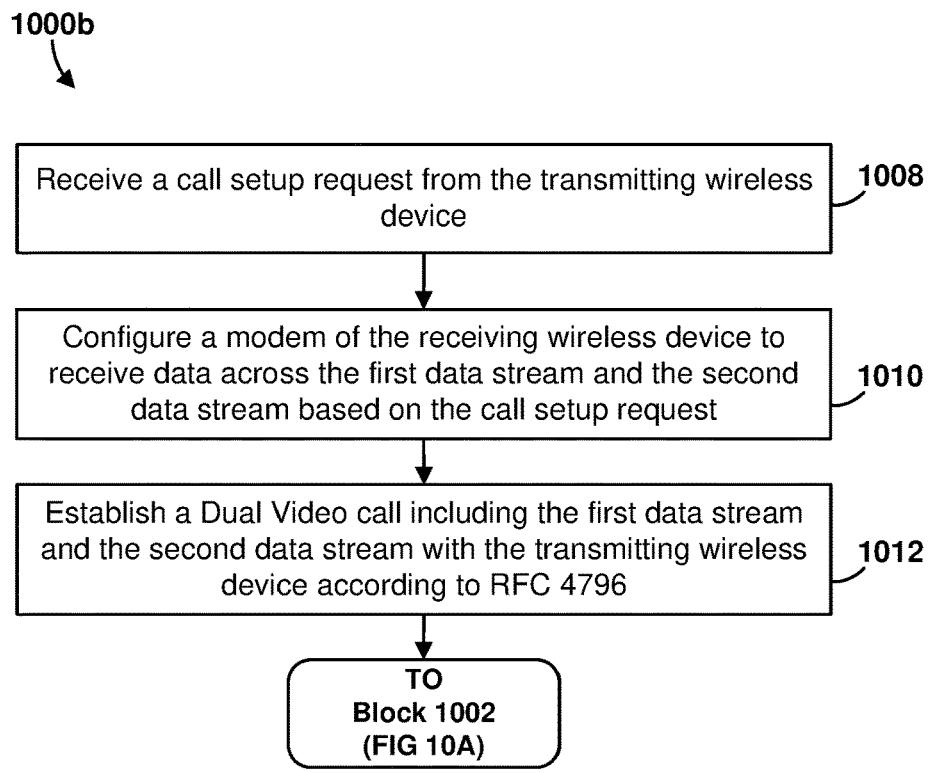
FIGS. 10B-10E are process flow diagrams of example operations 1000b-1000e that may be performed as part of the method 1000a for rendering AR content in accordance with some embodiments.

FIG. 10B illustrates operations 1000b that may be performed as part of the method 1000a for rendering AR content in accordance with some embodiments. With reference to FIGS. 1A-10B, the processor of the receiving wireless device (e.g., receiving wireless device 504) may perform operations including receiving a call setup request (e.g., SIP request) from the transmitting wireless device (e.g., transmitting wireless device 502) in block 1008. Means for performing the operations of block 1008 may include a processor (e.g., 210, 212, 214, 216, 218, 252, 260, 422) of a wireless device (e.g., 120, 200, 320, 402, 504) executing the transmit-receive module 432, and the SIP setup module 430.

In block 1010, the processor of the receiving wireless device may perform operations including configuring a modem (e.g., 212, 252) of the receiving wireless device to receive data across the first data stream and the second data stream based on the call setup request. Means for performing the operations of block 1010 may include a processor (e.g., 210, 212, 214, 216, 218, 252, 260, 422) of a wireless device (e.g., 120, 200, 320, 402, 504) executing the SIP setup module 430.

In block 1012, the processor of the receiving wireless device may perform operations including establishing a Dual Video call including the first data stream and the second data stream with the transmitting wireless device according to RFC 4796. Means for performing the operations of block 1012 may include a processor (e.g., 210, 212, 214, 216, 218, 252, 260, 422) of a wireless device (e.g., 120, 200, 320, 402, 504) executing the SIP setup module 430.

After the operations in block 1012, the processor may perform the operations in block 1002 as described.

Figure 10C:
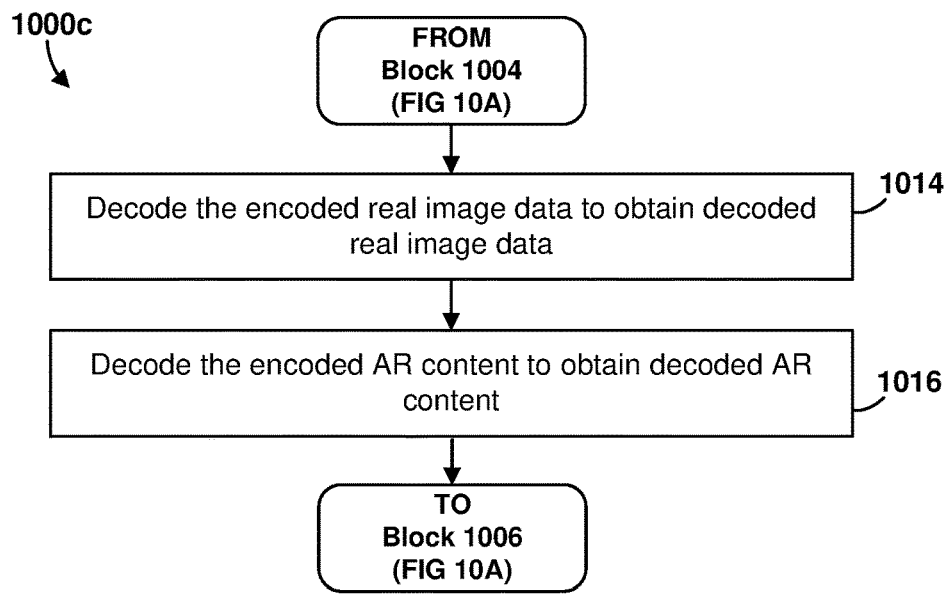

FIG. 10C illustrates operations 1000c that may be performed as part of the method 1000a for rendering AR content in accordance with some embodiments. With reference to FIGS. 1A-10C, following the operations in block 1004, the processor of the receiving wireless device (e.g., receiving wireless device 504) may perform operations including decoding the encoded real image data (e.g., real-world image 612 data) to obtain decoded real image data in block 1014. Means for performing the operations of block 1014 may include a processor (e.g., 210, 212, 214, 216, 218, 252, 260, 422) of a wireless device (e.g., 120, 200, 320, 402, 504) executing the encoding/decoding module 440.

In block 1016, the processor of the receiving wireless device (e.g., receiving wireless device 504) may perform operations including decoding the encoded AR content to obtain decoded AR content (e.g., AR content 611 data). Means for performing the operations of block 1016 may include a processor (e.g., 210, 212, 214, 216, 218, 252, 260, 422) of a wireless device (e.g., 120, 200, 320, 402, 504) executing the encoding/decoding module 440.

After the operations in block 1016, the processor may perform the operations in block 1006 as described.

Figure 10D:
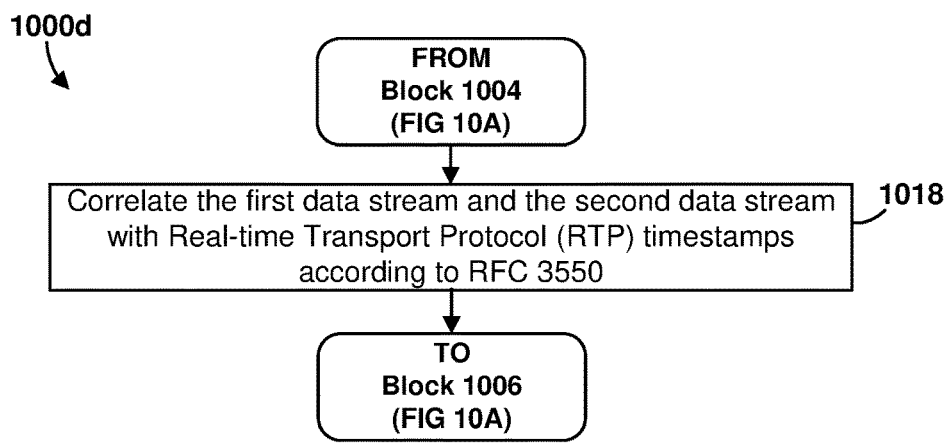

FIG. 10D illustrates operations 1000d that may be performed as part of the method 1000a for rendering AR content in accordance with some embodiments. With reference to FIGS. 1A-10D, following the operations in block 1004, the processor of the receiving wireless device (e.g., receiving wireless device 504) may perform operations including correlating the first data stream and the second data stream with Real-time Transport Protocol (RTP) timestamps according to RFC 3550 in block 1018. Means for performing the operations of block 1018 may include a processor (e.g., 210, 212, 214, 216, 218, 252, 260, 422) of a wireless device (e.g., 120, 200, 320, 402, 504) executing the RTP timestamp module 442.

After the operations in block 1018, the processor may perform the operations in block 1006 as described.

Figure 10E:
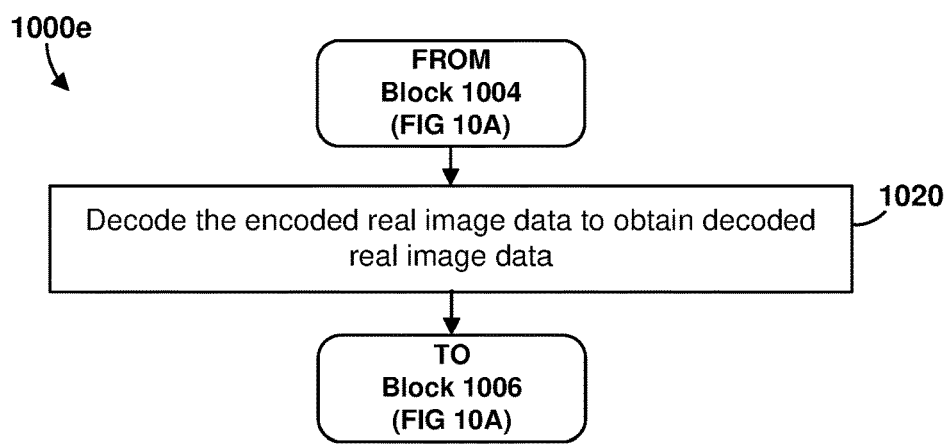

FIG. 10E illustrates operations 1000e that may be performed as part of the method 1000a for rendering AR content in accordance with some embodiments. With reference to FIGS. 1A-10E, following the operations in block 1004, the processor of the receiving wireless device (e.g., receiving wireless device 504) may perform operations including compositing the AR content with the real image data to form a composite 2D image in block 1020. Means for performing the operations of block 1020 may include a processor (e.g., 210, 212, 214, 216, 218, 252, 260, 422) of a wireless device (e.g., 120, 200, 320, 402, 504) executing the compositor module 438.

After the operations in block 1020, the processor may perform the operations in block 1006 as described.

Figure 11:
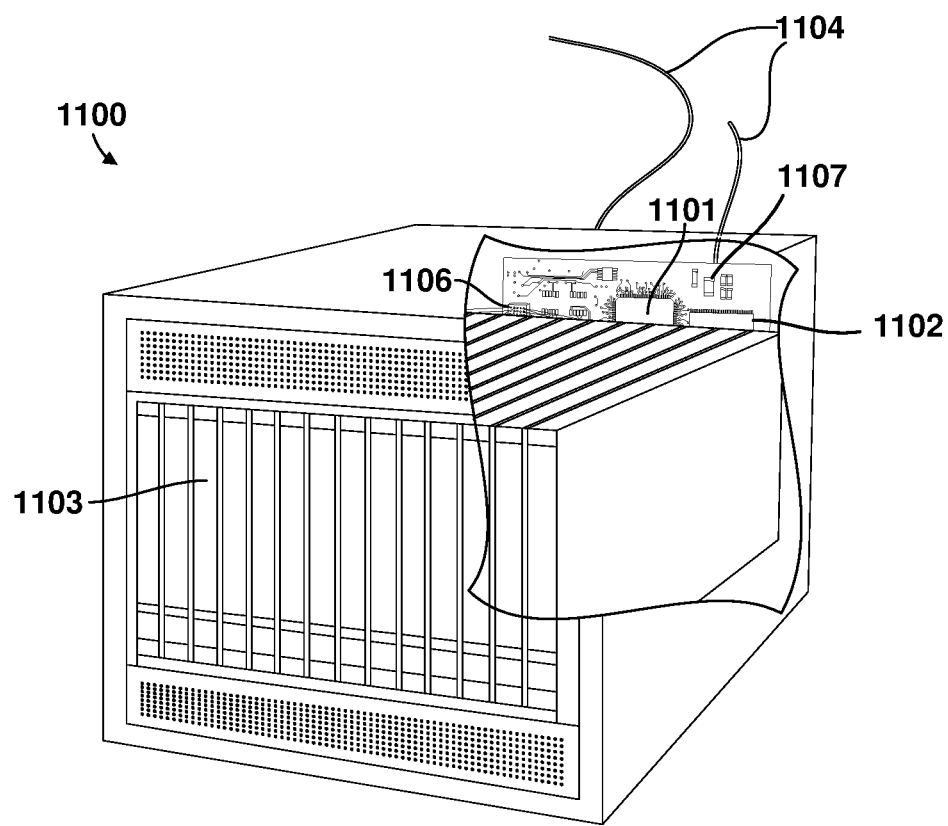
FIG. 11 is a component block diagram of a network computing device suitable for use with various embodiments.

FIG. 11 is a component block diagram of a network computing device 1100, such as a base station (e.g., base station 110a-d, 350), suitable for use with various embodiments. Such network computing devices (e.g., base stations, such as gNBs, eNBs, etc.) may include at least the components illustrated in FIG. 11. With reference to FIGS. 1-11, the network computing device 1100 may include a processor 1101 coupled to volatile memory 1102 and a large capacity nonvolatile memory, such as a disk drive 1103.

The network computing device 1100 may also include a peripheral memory access device such as a floppy disc drive, compact disc (CD) or digital video disc (DVD) drive 1106 coupled to the processor 1101. The network computing device 1100 may also include network access ports 1104 (or interfaces) coupled to the processor 1101 for establishing data connections with a network, such as the Internet and/or a local area network coupled to other system computers and servers.

The network computing device 1100 may include one or more antennas 1107 for sending and receiving electromagnetic radiation that may be connected to a wireless communication link. The network computing device 1100 may include additional access ports, such as USB, Firewire, Thunderbolt, and the like for coupling to peripherals, external memory, or other devices.

Figure 12:
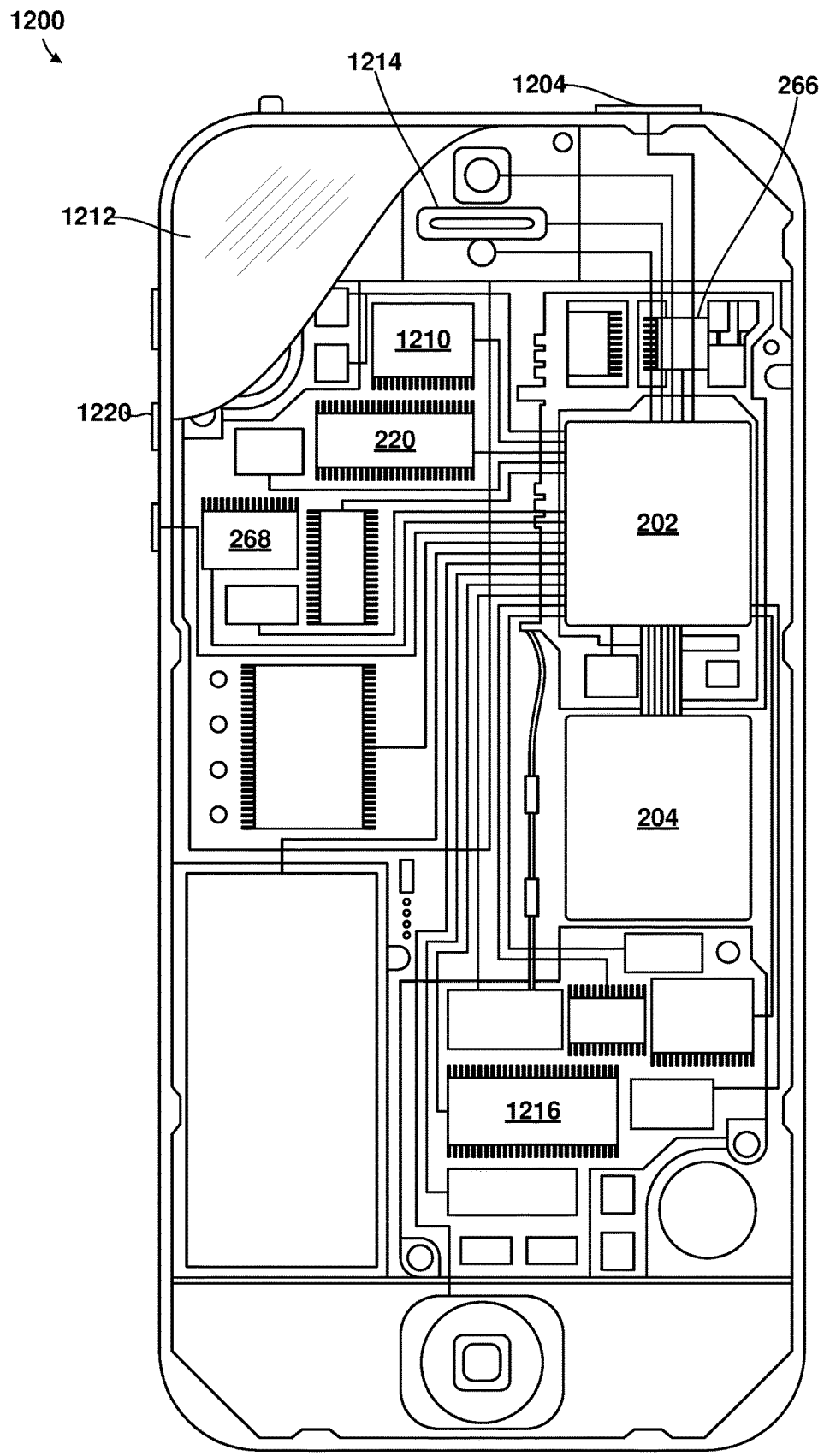
FIG. 12 is a component block diagram of a wireless device suitable for use with various embodiments.

FIG. 12 is a component block diagram of a wireless device 1200 suitable for use with various embodiments. With reference to FIGS. 1-12, various embodiments may be implemented on a variety of wireless devices 1200 (e.g., wireless device 120, 200, 320, 402, 502, 504), an example of which is illustrated in FIG. 12 in the form of a smartphone. The wireless device 1200 may include a first SoC 202 (e.g., a SoC-CPU) coupled to a second SoC 204 (e.g., a 5G capable SoC). The first and second SoCs 202, 204 may be coupled to internal memory 1216, a display 1212, and to a speaker 1214. The first and second SoCs 202, 204 may also be coupled to at least one SIM 268 and/or a SIM interface that may store information supporting a first 5GNR subscription and a second 5GNR subscription, which support service on a 5G non-standalone (NSA) network.

The wireless device 1200 may include an antenna 1204 for sending and receiving electromagnetic radiation that may be connected to a wireless transceiver 266 coupled to one or more processors in the first and/or second SoCs 202, 204. The wireless device 1200 may also include menu selection buttons or rocker switches 1220 for receiving user inputs.

The wireless device 1200 also includes a sound encoding/decoding (CODEC) circuit 1210, which digitizes sound received from a microphone into data packets suitable for wireless transmission and decodes received sound data packets to generate analog signals that are provided to the speaker to generate sound. Also, one or more of the processors in the first and second SoCs 202, 204, wireless transceiver 266 and CODEC 1210 may include a digital signal processor (DSP) circuit (not shown separately).

The processors of the wireless network computing device 1100 and the wireless device 1200 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SoC 204 dedicated to wireless communication functions and one processor within an SoC 202 dedicated to running other applications. Software applications may be stored in the memory 220, 1216 before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device including a processor configured with processor-executable instructions to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method performed by a processor of a receiving wireless device for rendering augmented reality content, including receiving real image data from a transmitting wireless device via a first data stream, receiving augmented reality (AR) content from the transmitting wireless device via a second data stream that is an alt video stream, in which the AR content is for display with the real image data, and displaying the AR content in conjunction with the real image data.

Example 2. The method of example 1, in which the first data stream and the second data stream are Real-time Transport Protocol (RTP) streams, and in which the AR content is received as part of an RTP extension header.

Example 3. The method of either of example 1 or 2, in which the first data stream and the second data stream are Real-time Transport Protocol (RTP) Control Protocol (RTCP) streams, and in which the AR content is received as part of an RTCP application-defined (APP) packet.

Example 4. The method of any of examples 1-3, further including receiving a call setup request from the transmitting wireless device, configuring a modem of the receiving wireless device to receive data across the first data stream and the second data stream based on the call setup request, and establishing a Dual Video call including the first data stream and the second data stream with the transmitting wireless device according to RFC 4796.

Example 5. The method of any of examples 1-4, in which receiving real image data from the transmitting wireless device via the first data stream includes receiving encoded real image data from the transmitting wireless device via the first data stream, and in which receiving AR content from the transmitting wireless device via the second data stream includes receiving encoded AR content from the transmitting wireless device via the second data stream, in which the method further includes decoding the encoded real image data to obtain decoded real image data, and decoding the encoded AR content to obtain decoded AR content; and in which displaying the AR content in conjunction with the real image data further includes displaying the decoded AR content in conjunction with the decoded real image data.

Example 6. The method of any of examples 1-5, further including correlating the first data stream and the second data stream with Real-time Transport Protocol (RTP) timestamps according to RFC 3550, in which displaying the AR content in conjunction with the real image data includes displaying the AR content in conjunction with the real image data based on the RTP timestamps.

Example 7. The method of any of examples 1-6, in which displaying the AR content in conjunction with the real image data includes transmitting the real image data and coordinate translations to a monitor communicatively coupled to the receiving wireless device to cause the monitor to display the real image data and the coordinate translations, and transmitting the AR content and the coordinate translations to an AR user equipment communicatively coupled to the receiving wireless device to cause the AR user equipment to display the AR content and the coordinate translations.

Example 8. The method of any of examples 1-7, further including compositing the AR content with the real image data to form a composite two-dimensional (2D) image, in which displaying the AR content in conjunction with the real image data includes transmitting the composite 2D image to an AR user equipment communicatively coupled to the receiving wireless device to cause the AR user equipment to display the composite 2D image.

Example 9. The method of any of examples 1-8, further including compositing the AR content with the real image data to form a composite two-dimensional (2D) image, in which displaying the AR content in conjunction with the real image data further includes displaying the composite 2D image on a display terminal of the receiving wireless device.

Example 10. The method of any of examples 1-9, in which receiving the augmented reality (AR) content from the transmitting wireless device via the second data stream includes receiving a composite two-dimensional (2D) image composed of the AR content and the real image data from the transmitting wireless device via the second data stream, and in which displaying the AR content in conjunction with the real image data includes displaying the composite 2D image.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdma-One, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a receiving wireless device for rendering augmented reality content, comprising:
   receiving real image data from a transmitting wireless device via a first data stream, the first data stream including a Session Description Protocol (SDP) Content Attribute set to "main";
   transmitting a Session Initiation Protocol (SIP) message indicating a capability of the receiving wireless device to receive augmented reality (AR) content across a second data stream that includes an SDP Content Attribute set to "alt";
   based on the SIP message indicating the capability of the receiving wireless device to receive AR content across the second data stream, receiving AR content from the transmitting wireless device via the second data stream, the second data stream including the SDP Content Attribute set to "alt", wherein the AR content is for display with the real image data; and
   displaying the AR content received via the second data stream in conjunction with the real image data received via the first data stream.

2. The method of claim 1, wherein the first data stream and the second data stream are Real-time Transport Protocol (RTP) streams, and wherein the AR content is received as part of an RTP extension header.

3. The method of claim 1, wherein the first data stream and the second data stream are Real-time Transport Protocol (RTP) Control Protocol (RTCP) streams, and wherein the AR content is received as part of an RTCP application-defined (APP) packet.

4. The method of claim 1, further comprising:
   receiving a call setup request from the transmitting wireless device;
   configuring a modem of the receiving wireless device to receive data across the first data stream and the second data stream based on the call setup request; and
   establishing a Dual Video call including the first data stream and the second data stream with the transmitting wireless device according to RFC 4796.

5. The method of claim 1, wherein:
   receiving real image data from the transmitting wireless device via the first data stream further comprises receiving encoded real image data from the transmitting wireless device via the first data stream;
   receiving AR content from the transmitting wireless device via the second data stream further comprises receiving encoded AR content from the transmitting wireless device via the second data stream;
   the method further comprises:
      decoding the encoded real image data to obtain decoded real image data; and
      decoding the encoded AR content to obtain decoded AR content; and
   displaying the AR content in conjunction with the real image data further comprises displaying the decoded AR content in conjunction with the decoded real image data.

6. The method of claim 1, further comprising:
   correlating the first data stream and the second data stream with Real-time Transport Protocol (RTP) timestamps according to RFC 3550,
   wherein displaying the AR content in conjunction with the real image data further comprises displaying the AR content in conjunction with the real image data based on the RTP timestamps.

7. The method of claim 1, wherein displaying the AR content in conjunction with the real image data further comprises:
   transmitting the real image data and coordinate translations to a monitor communicatively coupled to the receiving wireless device to cause the monitor to display the real image data and the coordinate translations; and
   transmitting the AR content and the coordinate translations to an AR user equipment communicatively coupled to the receiving wireless device to cause the AR user equipment to display the AR content and the coordinate translations.

8. The method of claim 1, further comprising:
   compositing the AR content with the real image data to form a composite two-dimensional (2D) image,
   wherein displaying the AR content in conjunction with the real image data further comprises transmitting the composite 2D image to an AR user equipment communicatively coupled to the receiving wireless device to cause the AR user equipment to display the composite 2D image.

9. The method of claim 1, further comprising:
   compositing the AR content with the real image data to form a composite two-dimensional (2D) image,
   wherein displaying the AR content in conjunction with the real image data further comprises displaying the composite 2D image on a display terminal of the receiving wireless device.

10. The method of claim 1, wherein receiving the augmented reality (AR) content from the transmitting wireless device via the second data stream further comprises receiving a composite two-dimensional (2D) image composed of the AR content and the real image data from the transmitting wireless device via the second data stream, and
   wherein displaying the AR content in conjunction with the real image data further comprises displaying the composite 2D image.

11. A wireless device comprising:
   a processor configured with processor-executable instructions to:
      receive real image data from a transmitting wireless device via a first data stream, the first data stream including a Session Description Protocol (SDP) Content Attribute set to "main";

transmit a Session Initiation Protocol (SIP) message indicating a capability of the wireless device to receive augmented reality (AR) content across a second data stream that includes an SDP Content Attribute set to "alt";

based on the SIP message indicating the capability of the wireless device to receive AR content across the second data stream, receive AR content from the transmitting wireless device via the second data stream, the second data stream including the SDP Content Attribute set to "alt", wherein the AR content is for display with the real image data; and display the AR content received via the second data stream in conjunction with the real image data received via the first data stream.

12. The wireless device of claim 11, wherein the first data stream and the second data stream are Real-time Transport Protocol (RTP) streams, and wherein the AR content is received as part of an RTP extension header.

13. The wireless device of claim 11, wherein the first data stream and the second data stream are Real-time Transport Protocol (RTP) Control Protocol (RTCP) streams, and wherein the AR content is received as part of an RTCP application-defined (APP) packet.

14. The wireless device of claim 11, wherein the processor is configured with processor-executable instructions to perform operations further comprising:
receiving a call setup request from the transmitting wireless device;
configuring a modem of the wireless device to receive data across the first data stream and the second data stream based on the call setup request; and
establishing a Dual Video call including the first data stream and the second data stream with the transmitting wireless device according to RFC 4796.

15. The wireless device of claim 11, wherein:
the processor is configured with processor-executable instructions to perform operations such that:
receiving real image data from the transmitting wireless device via the first data stream further comprises receiving encoded real image data from the transmitting wireless device via the first data stream;
receiving AR content from the transmitting wireless device via the second data stream further comprises receiving encoded AR content from the transmitting wireless device via the second data stream;
the processor is configured with processor-executable instructions to perform operations further comprising:
decoding the encoded real image data to obtain decoded real image data; and
decoding the encoded AR content to obtain decoded AR content; and
the processor is configured with processor-executable instructions to perform operations such that displaying the AR content in conjunction with the real image data further comprises displaying the decoded AR content in conjunction with the decoded real image data.

16. The wireless device of claim 11, wherein the processor is configured with processor-executable instructions to perform operations further comprising correlating the first data stream and the second data stream with Real-time Transport Protocol (RTP) timestamps according to RFC 3550,
wherein the processor is configured with processor-executable instructions to perform operations such that displaying the AR content in conjunction with the real image data further comprises displaying the AR content in conjunction with the real image data based on the RTP timestamps.

17. The wireless device of claim 11, wherein the processor is configured with processor-executable instructions to perform operations such that displaying the AR content in conjunction with the real image data further comprises:
transmitting the real image data and coordinate translations to a monitor communicatively coupled to the wireless device to cause the monitor to display the real image data and the coordinate translations; and
transmitting the AR content and the coordinate translations to an AR user equipment communicatively coupled to the wireless device to cause the AR user equipment to display the AR content and the coordinate translations.

18. The wireless device of claim 11, wherein the processor is configured with processor-executable instructions to perform operations further comprising compositing the AR content with the real image data to form a composite two-dimensional (2D) image,
wherein the processor is configured with processor-executable instructions to perform operations such that displaying the AR content in conjunction with the real image data further comprises transmitting the composite 2D image to an AR user equipment communicatively coupled to the wireless device to cause the AR user equipment to display the composite 2D image.

19. The wireless device of claim 11, wherein the processor is configured with processor-executable instructions to perform operations further comprising compositing the AR content with the real image data to form a composite two-dimensional (2D) image,
wherein the processor is configured with processor-executable instructions to perform operations such that displaying the AR content in conjunction with the real image data further comprises displaying the composite 2D image on a display terminal of the wireless device.

20. The wireless device of claim 11, wherein the processor is configured with processor-executable instructions to perform operations such that:
receiving the augmented reality (AR) content from the transmitting wireless device via the second data stream further comprises receiving a composite two-dimensional (2D) image composed of the AR content and the real image data from the transmitting wireless device via the second data stream, and
displaying the AR content in conjunction with the real image data further comprises displaying the composite 2D image.

21. A wireless device, comprising:
means for receiving real image data from a transmitting wireless device via a first data stream, the first data stream including a Session Description Protocol (SDP) Content Attribute set to "main;
means for transmitting a Session Initiation Protocol (SIP) message indicating a capability of the wireless device to receive augmented reality (AR) content across a second data stream that includes an SDP Content Attribute set to "alt";
means for receiving based on the SIP message indicating the capability of the wireless device to receive AR content across the second data stream, AR content from the transmitting wireless device via the second data stream, the second data stream including the SDP Content Attribute set to "alt", wherein the AR content is for display with the real image data; and means for displaying the AR content received via the second data stream in conjunction with the real image data received via the first data stream.

22. The wireless device of claim 21, wherein either:
the first data stream and the second data stream are Real-time Transport Protocol (RTP) streams, and wherein the AR content is received as part of an RTP extension header; or
the first data stream and the second data stream are Real-time Transport Protocol (RTP) Control Protocol (RTCP) streams, and wherein the AR content is received as part of an RTCP application-defined (APP) packet.

23. The wireless device of claim 21, further comprising:
means for receiving a call setup request from the transmitting wireless device;
means for configuring a modem of the wireless device to receive data across the first data stream and the second data stream based on the call setup request; and
means for establishing a Dual Video call including the first data stream and the second data stream with the transmitting wireless device according to RFC 4796.

24. The wireless device of claim 21, wherein:
means for receiving real image data from the transmitting wireless device via the first data stream further comprises means for receiving encoded real image data from the transmitting wireless device via the first data stream;
means for receiving AR content from the transmitting wireless device via the second data stream further comprises means for receiving encoded AR content from the transmitting wireless device via the second data stream;
the wireless device further comprises:
means for decoding the encoded real image data to obtain decoded real image data; and
means for decoding the encoded AR content to obtain decoded AR content; and
means for displaying the AR content in conjunction with the real image data further comprises means for displaying the decoded AR content in conjunction with the decoded real image data.

25. The wireless device of claim 21, further comprising:
means for correlating the first data stream and the second data stream with Real-time Transport Protocol (RTP) timestamps according to RFC 3550,
wherein means for displaying the AR content in conjunction with the real image data further comprises means for displaying the AR content in conjunction with the real image data based on the RTP timestamps.

26. The wireless device of claim 21, wherein means for displaying the AR content in conjunction with the real image data further comprises:
means for transmitting the real image data and coordinate translations to a monitor communicatively coupled to the wireless device to cause the monitor to display the real image data and the coordinate translations; and
means for transmitting the AR content and the coordinate translations to an AR user equipment communicatively coupled to the wireless device to cause the AR user equipment to display the AR content and the coordinate translations.

27. The wireless device of claim 21, further comprising:
means for compositing the AR content with the real image data to form a composite two-dimensional (2D) image,
wherein means for displaying the AR content in conjunction with the real image data further comprises means for transmitting the composite 2D image to an AR user equipment communicatively coupled to the wireless device to cause the AR user equipment to display the composite 2D image.

28. The wireless device of claim 21, further comprising:
means for compositing the AR content with the real image data to form a composite two-dimensional (2D) image,
wherein means for displaying the AR content in conjunction with the real image data further comprises means for displaying the composite 2D image on a display terminal of the wireless device.

29. The wireless device of claim 21, wherein means for receiving the augmented reality (AR) content from the transmitting wireless device via the second data stream further comprises means for receiving a composite two-dimensional (2D) image composed of the AR content and the real image data from the transmitting wireless device via the second data stream, and
wherein means for displaying the AR content in conjunction with the real image data further comprises means for displaying the composite 2D image.

30. A non-transitory processor-executable medium having stored thereon processor-executable instructions configured to cause a processor of a wireless device to perform operations comprising:
receiving real image data from a transmitting wireless device via a first data stream, the first data stream including a Session Description Protocol (SDP) Content Attribute set to "main";
transmitting a Session Initiation Protocol (SIP) message indicating a capability of the wireless device to receive augmented reality (AR) content across a second data stream that includes an SDP Content Attribute set to "alt";
based on the SIP message indicating the capability of the wireless device to receive AR content across the second data stream, receiving AR content from the transmitting wireless device via the second data stream, that is an alt video stream the second data stream including the SDP Content Attribute set to "alt", wherein the AR content is for display with the real image data; and
displaying the AR content received via the second data stream in conjunction with the real image data received via the first data stream.

* * * * *